United States Patent [19]
Teraoka et al.

[11] Patent Number: 5,735,765
[45] Date of Patent: Apr. 7, 1998

[54] DIFFERENTIAL APPARATUS

[75] Inventors: Masao Teraoka; Satoshi Aiba; Hiraishi Kenji; Kazumitsu Ugajin; Shuhei Ono, all of Tochigi, Japan

[73] Assignee: Tochigi Fuji Sangyo Kabushiki Kaisha, Tochigi-Ken, Japan

[21] Appl. No.: 587,324

[22] Filed: Jan. 12, 1996

[30] Foreign Application Priority Data

| Jan. 12, 1995 | [JP] | Japan | 7-003319 |
| Jun. 22, 1995 | [JP] | Japan | 7-156088 |

[51] Int. Cl.⁶ ............... F16H 1/45; F16H 57/04; B60K 17/20
[52] U.S. Cl. ............... 475/248; 475/252; 475/160
[58] Field of Search ............... 475/159, 160, 475/231, 234, 248, 249, 250, 252

[56] References Cited

U.S. PATENT DOCUMENTS

| 4,560,056 | 12/1985 | Stockton | 475/248 |
| 5,624,344 | 4/1997 | Yehl et al. | 475/160 |

FOREIGN PATENT DOCUMENTS

| 0622569 | 4/1994 | European Pat. Off. . |
| 0639730 | 8/1994 | European Pat. Off. . |
| 1527423 | 4/1968 | France . |
| 3920794 | 6/1989 | Germany . |
| 6323373 | 11/1994 | Japan . |
| 771560 | 3/1995 | Japan . |

*Primary Examiner*—Khoi Q. Ta
*Attorney, Agent, or Firm*—Howard & Howard

[57] ABSTRACT

A differential apparatus (7) comprises: a differential casing (21) rotated by an engine power; a plurality of pinion gears (65, 66) slidably housed in accommodation holes (63, 64) formed in the differential casing; a pair of side gears (35, 37) geared with each other via the pinion gears, two opposing end surfaces thereof being slid relative to other either directly or via a thrust washer (61); and a block member (47, 91, 97) interposed between two inner circumferential surfaces of the two side gears so as to center the side gears, respectively. In particular, at least one oil sump (77, 79; 95; 101) is formed between the block member and the side gears, to supply lubricant to sliding portions between the block member (47, 91, 97) and the side gears (35, 37) and between two opposing end surfaces of the two side gears, by a centrifugal force generated by the rotating differential casing. Further, it is preferable to further form at least one central oil passage (301, 303, 305) at the centering portion (365) so as to extend from an inner circumferential side to an outer circumferential side of the boss portions (357, 359) of the two side gears (353, 355). Further, it is also preferable to form at least two radial oil passages (881, 885; 977, 978) between inner wall surfaces of the differential casing (821, 921) and the side gears (835, 837; 939, 941), respectively in such a way that a radially inward end thereof communicates with the helical oil passage (877, 879; 979L, 979R) and a radially outward end thereof communicates with sliding portion between the side gear and the differential casing, respectively.

12 Claims, 26 Drawing Sheets

DIFFERENTIAL APPARATUS

BACKGROUND OF THE INVENTION

1. Field of the Invention

The present invention relates to a differential apparatus, and more specifically to an improvement of lubrication for a differential apparatus composed for parallel axis pinion gears and which is applicable to front, center and rear differential gears for an automotive vehicle.

2. Description of the Prior Art

Some examples of prior art differential apparatus related to a first aspect of the present invention will be described hereinbelow with reference to the attached drawings.

FIG. 1 shows a first prior art differential apparatus disclosed in Japanese Published Unexamined (Kokai) Utility Model Application No. 1-146062. This differential apparatus 201 includes a plurality of worm wheel sets 209, each composed of two worm wheels 207 separately in mesh with each other at a respective spur gear portion thereof and a pair of worm gears 211 and 213 (i.e., side gears) each in mesh with each worm wheel 207. Further, each of the two worm gears 211 and 213 are spline-coupled with one of two output (wheel drive) shafts 215 and 217 of an automotive vehicle, respectively.

Therefore, when a differential casing 219 is rotated by an engine power, the drive power of the engine is distributed to both right and left output (wheel drive) shafts from the worm wheel sets 209 to the two worm gears (i.e., two side gears) 211 and 213, respectively. In this case, the differential motion can be limited by frictional resistances generated between the worm wheels 207 and worm gears 211 and 213, respectively.

FIG. 2 shows a second prior art differential apparatus whose structure is similar to that disclosed in Japanese Published Unexamined (Kokai) Patent Application No. 6-207645. This differential apparatus 203 includes a pair of helical pinion gears 221 and 223 slidably and rotatably housed in accommodation holes formed in a differential casing, respectively and in mesh with each other. A pair of helical side gears 225 and 227 are in mesh with the helical pinion gears 223 and 221, respectively. Further, the helical side gears 225 and 227 are spline-coupled with one of two output (wheel drive) shafts of an automotive vehicle, respectively.

Therefore, when a differential casing is rotated by an engine power, the drive power of the engine is distributed to both right and left wheels from the helical pinion gears 221 and 223 to the helical side gears 225 and 227, respectively. In this case, the differential motion can be limited by frictional resistances generated between the respective helical gears 221, 223, 225 and 227 due to thrust forces generated by gearing between the respective helical gears. The differential motion can also be limited by other frictional resistance generated between the respective helical gears 221, 223, 225 and 227 and the inner wall surfaces of accommodation holes or sliding portions of the differential casing due to reaction forces generated between the respective helical gears. In the differential apparatus 203, the two helical side gears 225 and 227 are directly in sliding contact with respect to each other at each inner end surface thereof.

FIG. 3 shows a third prior art differential apparatus disclosed in Japanese Published Unexamined (Kokai) Patent Application No. 7-71560. This differential apparatus 205 includes two helical side gears 229 and 231 and a thrust washer 233 interposed between the two side gears 229 and 231. In this differential apparatus 205, the two helical side gears 229 and 231 are indirectly slid with respect to each other via the thrust washer 233.

In order to obtain a stable differential limiting force generated due to the sliding motion between the two helical side gears 229 and 231; that is, to prevent the vibration of the two helical side gears, the helical side gear 229 is formed with a cylindrical projected portion 235 and the helical side gear 231 is formed with a cylindrical recessed portion 237 so that the two helical side gears can be aligned with each other at a centering portion 239. In addition, a thrust block 241 is interposed between two inner circumferential surface portions of the two helical side gears 229 and 231 in such a way as to be brought into contact with the inner ends of the two output shafts fixed to the two side gears 229 and 231, respectively.

In the above-mentioned first prior art differential apparatus shown in FIG. 1, a helical oil groove 243 is formed in the differential casing 219 for lubrication. Further, in the differential apparatus shown in FIG. 3, in general, some oil gaps (i.e., grooves) are formed by cutting off some teeth formed at the spline portion between each helical side gear 229 or 231 and each output shaft, in order to introduce lubricant from the helical oil groove (e.g., as shown in FIG. 1) into an inner side between the two helical side gears 229 and 231. In other words, in the differential apparatus, although some oil passages are generally formed to introduce lubricant from outside the differential casing to inside the differential casing, when the thrust block 241 is interposed in the inner circumferential surface portions of the two helical side gears 229 and 231 as shown in FIG. 3, since lubricant flow is shut off by the presence of the thrust block 241. It is difficult to allow the introduced lubricant to flow to the respective sliding portions between the thrust block 241 and the two inner end surfaces of the two helical side gears 229 and 231. Thus, there exists a problem in that seizure occurs at the inner end surfaces of the two helical side gears 229 and 231. In addition, the centering portion 239 as shown in FIG. 3, prevents the lubricant from flowing smoothly, and there exists another problem in that seizure occurs at the sliding portion at this centering portion 239.

In addition, once lubricant flow is shut off as described above, lubricant cannot flow smoothly through the gaps formed between the helical side gears 229 and 231 and the output shafts respectively, there arises another problem in that cracks are easily produced due to the fretting corrosion at the spline portions between the side gears and the output shafts, respectively.

In addition, when the centering portion 239 is formed as shown in FIG. 3, the two helical side gears 229 and 231 cannot be used in common, and there exists a disadvantage that the number of parts increases. That is, a single type gear cannot be utilized.

An example of prior art differential apparatus related to a second aspect of the present invention will be described hereinbelow with reference to the attached drawings.

FIGS. 4(a) and 4(b) show a fourth prior art differential apparatus disclosed in Japanese Published Unexamined (Kokai) Patent Application No. 6-207646. This differential apparatus is of parallel shaft type, in which a differential limiting force can be obtained by rotational frictional forces generated between pinion gears and two side gears.

In the differential apparatus 401 shown in FIG. 4(a), a pair of side gears 404 and 406 are rotatably disposed in a differential casing 402 coaxially with the casing 402 so as to oppose each other at the central portion of the casing 402.

Further, the two side gears 404 and 406 are aligned with each other at a centering portion 405 by butting an inner projecting end surface of the side gear 404 into an inner recessed end portion of the side gear 406.

Further, a plurality of pairs of pinion gears 408 are arranged within the differential casing 401 in parallel with and around the rotational axis of the two side gears 404 and 406. One of the two pinion gears of each pair is in mesh with the left side gear 404 and the other (not shown) of the two pinion gears of each pair is in mesh with the right side gear 406. Further, the two pinion gears 408 in each pair are in mesh with each other.

The differential casing 402 is formed with accommodation holes 410 for housing these pinion gears 408 respectively, so that each of pinion gears 408 is slidably and rotatably housed in one of these accommodation holes 410. Further, the differential casing 402 is formed with a lubricant opening 412 in the outer circumferential wall thereof to exhaust lubricant from the rotating pinion gears 408 to the outside of the differential casing 402.

Therefore, when the differential casing 402 is rotated, an engine power is distributed from the pinion gears 408 to the two side gears 404 and 406; and then, to the two output shafts, respectively. In more detail, the engine power can be distributed differentially to the right and left wheels, respectively on the basis of rotations of the respective pinion gears 408 each rotating on its own axis according to a difference in drive resistance between the two wheels. In this case, since the pinion gears 408 are slidably rotating in the accommodation holes 410 formed in the differential casing 402, respectively, once a differential motion occurs, a differential limiting force can be obtained due to the frictional resistances generated between the respective pinion gears 408, the side gears 404 and 406 and the other members (e.g., inner wall surfaces of the differential casing) in contact with these gears.

In the differential apparatus shown in FIG. 4(a), it is effective to provide a centering portion 405 between two inner end surfaces of the two side gears 404 and 406, in order to prevent misalignment between each pinion gear 408 and the center of each accommodation hole 41. This feature stabilizes the differential limiting characteristics, without causing any seizure between each pinion gear 408 and each accommodation hole 410.

Further, in the differential apparatus 401 of this type, it is well known that frictional force can be increased and thereby the differential limiting force can be strengthened by constructing the respective gears 404, 406 and 408 as helical gears; that is, by sliding the outer end surface portions 414 and 418 of the two side gears 404 and 406 with inner wall surfaces of the differential casing 402 according to the drive torque inputted to the differential casing 402, and by sliding the inner end surfaces 416 of the two side gears 404 and 406 with each other. Here, it is preferable to interpose a washer at each of these sliding portions 414, 416 and 418 to prevent the end surfaces of the side gears 404 and 406 and the wall surface of the differential casing 402 from being worn off easily, to eliminate the heat treatment process, and to smoothen the slidable motion for stabilization of the differential limiting characteristics, as disclosed in Japanese Published Unexamined Patent Application Nos. 6-1017414, and 6-185581.

However, in the prior art differential apparatus as shown in FIG. 4(a), since the boss portions of the two side gears 404 and 406 are formed into cylindrical shape, respectively, lubricant flows into the inner space formed between the two end surfaces of the two side gears through oil gaps formed by cutting off some teeth of each spline portion between the inner circumferential surface of the side gear and the outer circumferential surface of the output shaft, respectively, as shown by arrows shown in FIG. 4(b).

In the prior art differential apparatus shown in FIG. 4(a), however, the inner space formed between the two end surfaces of the two side gears 404 and 406 and is closed by the fitting surface at the centering portion 405 between the two side gears 404 and 406, the lubricant entering the inner space between the two side gears 404 and 406 cannot flow radially outward to the outer circumferential surfaces of the boss portion of the two side gears 406. Thus, there exists a problem in that lubricant cannot flow smoothly. In other words, at the centering portion 405, both the side gears are aligned with each other by bringing the two circumferential fitting surfaces of both the side gears into sliding contact with each other. The sliding contact portions shut off and enclose the lubricant passage, so that it has been impossible to obtain a definite lubricant flow.

Further, in the case where other boss portions are formed on the side of the axially outer end surfaces 414 and 418 of the side gears 404 and 406 in order to form two centering portions for the two side gears by use of the inner wall surfaces of the differential casing 402, the lubricant passage is blocked, and a definite lubricant flow cannot be obtained.

Some examples of prior art differential apparatus related to a third aspect of the present invention will be described hereinbelow with reference to the attached drawings.

FIG. 5 shows a fifth prior art differential apparatus disclosed in Japanese Published Unexamined (Kokai) Patent Application No. 59-97346. In this differential apparatus 501, a differential casing 503 is composed of a casing body 503a and two casing covers 503b and 503c. Engine power for rotating the differential casing 503 is transmitted from three pairs of first and second pinion gears 505 and 507 to two output shafts via two right and left side gears 509 and 511. The first and second pinion gears 505 and 507 and the right and left side gears 509 and 511 are all spur gears. Further, each pair of pinion gears 505 and 507 are slidably and rotatably housed in respective accommodation holes 513 and 515 formed in the casing body 503a of the differential casing 503.

When an engine torque is transmitted to the output shafts during straight drive or turning drive, the two pinion gears 505 and 507 are brought into pressure contact with the wall surfaces of the accommodation holes 513 and 515. This is due to the gearing between the two pinion gears 505 and 507 and the two side gears 509 and 511, respectively or due to the gearing between the two pinion gears 505 and 507 themselves. Thus, pinion gears 505 and 507 rotate under frictional contact with the differential casing 503. The frictional resistance generated as described above becomes a differential limiting force for the differential apparatus.

FIG. 6 shows a sixth prior art differential apparatus disclosed in Japanese Published Unexamined (Kokai) Patent Application No. 60-175843. In differential apparatus 601, a drive power of an engine for rotating a differential casing 603 is transmitted from pairs of two pinion gears 605 and 607 to two output shafts via two output side gears 609 and 611, respectively. These pinion gears 605 and 607 are also slidably and rotatably housed in accommodation holes 613 and 615 formed in the differential casing 603, respectively. The pinion gears 605 and 607 and the side gears 609 and 611 are all helical gears. Further, the differential casing 603 is formed with an opening 619 on a side wall portion thereof to introduce lubricant from outside thereof into the differential casing 603.

When a torque is being transmitted, the helical pinion gears 605 and 607 are brought into pressure contact with the wall surfaces of the accommodation holes 613 and 615 of the differential casing 603, respectively by reaction force generated due to the gearing between the helical pinion gears and the helical side gears respectively, and frictional forces thus can be generated thereat. Further, other frictional forces can be also generated between the helical side gears 609 and 611 and between the respective helical gears 605, 607, 609 and 611 and the inner wall surfaces of the differential casing 603 due to thrust forces generated by the gearing between the helical gears. The frictional resistance generated as described above becomes a differential limiting force of the differential apparatus.

FIGS. 7(a) and 7(b) show a seventh prior art differential apparatus disclosed in Japanese Published Unexamined (Kokai) Patent Application No. 6-323373. In this differential apparatus 701, a drive power of an engine for rotating a differential casing 704 composed of a differential body 702 and a cover 703 is transmitted from a plurality (three in this example) of pairs of pinion gears 705 and 707 in mesh with each other. These pinion gears belong to central pinion gears of different pairs, respectively. Drive is transmitted to two output shafts via two right and left side gears 709 and 711, respectively. These pinion gears 705 and 707 are also slidably and rotatably housed in accommodation holes 713 and 715 formed in the differential casing 703, respectively. The pinion gears 705 and 707 and the side gears 709 and 711 are all helical gears. Further, the differential casing 703 is formed with an opening 720 on the outer circumferential wall portion of the casing body 702 to communicate with the outside of the differential casing 704.

When torque is being transmitted, the pinion gears 705 and 707 are brought into pressure contact with the wall surfaces of the accommodation holes 713 and 715 of the casing body 702, respectively by reaction force generated due to the gearing between the pinion gears and the side gears, respectively, and thus frictional forces can be generated thereat. Further, other frictional forces can be also generated between side gears 709 and 711 and between the respective gears 705, 707, 709 and 711 and the differential casing 704 due to thrust force generated by the gearing between the respective helical gears. The frictional resistance generated as described above becomes a differential limiting force of the differential apparatus.

In the above-mentioned prior art differential apparatus 501, 601 and 701 as shown in FIGS. 5, 6, and 7(a) and 7(b), the differential limiting force can be obtained by the respective gearing reaction forces generated between the pinion gears and the side gears according to the input torque and on the basis of the frictional resistance generated between the pinion and side gears and the differential casing due to the gearing thrust force. Accordingly, when sufficient lubricant is not supplied into the differential casing, that is, to the sliding portions between the pinion gears 505 and 507; 605 and 607; 705 and 707 and the accommodation holes 513 and 515; 613 and 615; and 713 and 715, respectively, there arises a serious problem in that seizure and scuffing (gall) occur. The result is that a stable differential limiting force cannot be obtained.

In particular, as with the case of the differential apparatus 601 and 701 as shown in FIGS. 6, 7(a) and 7(b), when the side gears 609 and 611; and 709 and 711 and the pinion gears 605 and 607; and 705 and 707 are helical gears. The frictional forces generated at the end surfaces of the pinion gears and the side gears due to the above-mentioned thrust force contributes much to the differential limiting Force. Sufficient lubrication is particularly essential at the respective end surfaces of these gear elements. It has been impossible to obtain sufficient lubrication by introducing lubricant only through the opening 619 or 720 formed in the side wall or the outer circumferential wall of the differential casing. This is because when lubricant is introduced into the differential casing through the opening 619 or 720. The introduced lubricant is scattered rearward and outward by centrifugal force of the various gears. Thus, the lubrication effect is particularly small at the sliding portions between the end surfaces of the side gears and the differential casing and at the sliding portions between the end surfaces of the pinion gears and the differential casing. Thus, there arises a serious problem in that seizure and scuffing occur frequently at these sliding portions, with the result that a stable differential limiting force cannot be so far obtained.

SUMMARY OF THE INVENTION

With these problems in mind therefore, it is a first object of the present invention to provide a differential apparatus which can obtain sufficient lubrication at the centering sliding portions between two side gears, the opposing end surfaces of the two side gears, and the spline portions between the two side gears and the two output shafts, respectively.

Further, a second object of the present invention is to provide a differential apparatus which can obtain a secure lubricant flow passage from the inner circumferential side at the centering portion of the two side gear boss portions to the outer circumferential side thereof.

Further, a third object of the present invention is to provide a differential apparatus which can obtain a sufficient lubrication at various sliding portions between the pinion gears, the side gears and the inner wall surfaces of the differential casing, for providing a stable differential limiting function.

To achieve the above-mentioned first object, the first aspect of the present invention provides a differential apparatus (7), comprising: a differential casing (21) rotated by an engine power; a plurality of pinion gears (65, 66) slidably housed in accommodation holes (63, 64) formed in said differential casing: a pair of side gears (35, 37) geared with each other via said pinion gears, two opposing end surfaces thereof being slid directly on each other or via a thrust washer (61); a block member (47, 91, 97) interposed between two inner circumferential surfaces of said two side gears so as to center said two side gears, respectively; and at least one oil sump (77, 79; 95; 101) formed between said block member and said two side gears, to supply lubricant to sliding portions between said block member (47, 91, 97) and said two side gears (35, 37) and between two opposing end surfaces of said two side gears, by a centrifugal force generated by said rotating differential casing.

In the differential apparatus, said differential casing is formed with helical oil grooves (81, 83) in inner circumferential surfaces of two boss portions (49, 51) thereof, respectively. Each of the two side gears is formed with an axial oil groove formed at the spline portion (53, 55) between said side gear and an output shaft spline-engaged with said side gear. This oil groove communicates with the helical oil groove (81, 83) and with said at least one oil sump (77, 79; 95; 101), respectively.

Further, the two output shafts are vehicle wheel drive shafts for transmitting engine power to two vehicle wheels, respectively; and said block member (47, 91, 97) is a thrust block for locating axial positions of the two vehicle wheel drive shafts.

Further, an outer diameter (D1) of said oil sumps (77, 79; 95; 101) is larger than an inner diameter (D2) of two boss portions (39, 41) of said two side gears (35, 37).

Further, the oil sumps (77, 79) are formed by cutout portions (73, 75) formed by cutting off said block member (47) at regular angular intervals in the circumferential surface of said block member (47). Further, the oil sump (95) is formed by cutting off a helical groove (93) in an outer circumferential surface of said block member (91). Further, the oil sumps (101) are formed by curing off a plurality of axial grooves (99) in an outer circumferential surface of said block member (97).

Further, a circulating lubrication passage is formed within said differential casing, by way of two helical oil grooves (81, 83) formed in two inner circumferential surfaces of two boss portions (49, 51) of said differential casing (21); the axial oil grooves formed at spline portions (53, 55) between said side gears (35, 37) and the output shafts spline-engaged with said side gears, respectively; said oil sumps (77, 79; 95; 101) formed by said block member; the accommodation holes (63, 64) for housing said pinion gears (65, 66), respectively; and openings (85, 87) formed in said differential casing and communicating between the accommodation holes and the outside of said differential casing.

Further, said pinion gears and side gears are helical gears. Further, the side gears (35, 37) are of the same shape and used in common.

Further, the second aspect of the present invention provides a differential apparatus comprising: a differential casing (321) rotated by engine power; a pair of side gears (353, 355) rotatably supported by and coaxially with said differential casing, two opposing end surfaces thereof being slid directly on each other or via a slide member (369), a centering portion (365) formed in two cylindrical boss portions (357, 359) of said side gears (353, 355) for alignment of said two side gears; and at least one pair of pinion gears (377, 379) each having a first gear portion (381, 387) and a second gear portion (383, 389), respectively and both slidably and rotatably housed in at least one pair of accommodation holes (373, 375) formed in said differential casing and around and in parallel with a central axis (L) of said differential casing. The first gear portions (381, 387) thereof being in mesh with said two different side gears, respectively and the second gear portions (383, 389) thereof being in mesh with each other. At least one central oil passage (301, 303, 305) is formed at the centering portion (365) so as to extend from an inner circumferential side to an outer circumferential side of the boss portions (357, 359) of said two side gears.

Further, at least two pairs of said pinion gears (377, 379) are arranged at regular angular intervals in a circumferential direction of said differential casing and symmetrically with respect to the central axial line of said differential casing. Central oil passages (301, 303, 305) whose number is the same as the number of the pinion gear pairs or of said pinion gears are formed at such positions so as to correspond to circumferential positions of said pinion gears (377, 379), respectively.

Further, the centering portion (365) is composed of an annular projecting portion (366) formed in an inner circumferential side of a sliding end surface (357a) of the inner boss portion (357) of one (353) of said side gears, and an annular recessed portion (367) formed in an inner circumferential side of a sliding end surface (359a) of the inner boss portion (359) of the other (355) of said side gears. At least one central radial oil passage (301) is formed, as said central oil passage, in at least one of two mutually sliding end surfaces of the annular projecting and recessed portions (366, 367) thereof so as to extend in a radial direction of the mutually sliding surface thereof.

Further, the centering portion (365) is composed of an annular projecting portion (366) formed in an inner circumferential side of a sliding end surface (357a) of the inner boss portion (357) of one (353) of said side gears, and an annular recessed portion (367) formed in an inner circumferential side of a sliding end surface (359a) of the inner boss portion (359) of the other (355) of said side gears; and at least one central axial oil passage (303) is formed, as said central oil passage, in one of two mutually fitting surfaces of the annular projecting and recessed portions (366, 367) thereof so as to extend along a circumferential direction of the mutual fitting surfaces thereof.

Further, the centering portion (365) is composed of an annular projecting portion (366) formed in an inner circumferential side of a sliding end surface (357a) of the inner boss portion (357) of one (353) of said side gears, and an annular recessed portion (367) formed in an inner circumferential side of a sliding end surface (359a) of the inner boss portion (359) of the other (355) of said side gears; and at least one central axial oil passage (305) is formed, as said central oil passage, in the other of two mutually fitting surfaces of the annular projecting and recessed portions (366, 367) thereof so as to extend along a circumferential direction of the mutual fitting surfaces thereof.

Further, at least one additional central radial oil groove is formed in an outer circumferential side of the sliding end portion (357a) of the boss portion (357) of one (353) of said two side gears or in an outer circumferential side of the other sliding end portions (359a) of the boss portion (359) of the other (355) of said two side gears, to communicate with said at least one central oil passage (301, 303, 305).

Further, a central washer (369) is interposed between the two inner sliding end portions (357a, 359a) of the two side gears (353, 355) in such a way that an inner circumferential surface of the central washer (369) is disposed in close vicinity to said central oil passage (301, 303, 305).

Further, a lubrication passage is formed between the inside and outside of said differential casing, by way of helical oil grooves (344, 346) formed in the inner circumferential surfaces of the boss portions (343, 345) of said differential casing (321); the axial oil grooves formed at spline portion between said side gears (353, 355) and the output shafts spline-engaged with said side gears, respectively; said central oil passage (301, 303, 305) formed at the centering portion; the accommodation holes (373, 375) for housing said pinion gears (377, 379); and openings (395, 396, 397) formed in said differential casing and communicating between the accommodation holes and the outside of said differential casing.

Further, said side gears and said pinion gears are all helical gears.

Further, the third aspect of the present invention provides a differential apparatus (807, 900) comprising: a differential casing (821, 921) disposed in an oil reservoir (808) and rotated by an engine power; a pair of side gears (835, 837; 939, 941) slidable at each end surface thereof directly or via a thrust washer (853, 855, 857; 951, 953, 955), said side gears being formed with boss portions (839, 841; 943, 945) connected to output shafts, respectively; at least one pair of pinion gears (863, 865; 961, 963) disposed on the radially outward side of said side gears and in mesh with each other, each pinion gear being in mesh with said side gear respectively, and slidably and rotatably housed in accommodation holes (859, 861; 957, 959) formed in said differential casing, respectively. Two helical oil passages (877, 879; 979L, 979R) are formed between two outer circumferential surfaces of the two output shafts and two inner circumferential surfaces of the two boss portions (849, 851; 935, 934) of said differential casing, respectively; and two radial oil passages (881, 885; 977, 978) formed between inner wall surfaces of said differential casing (821, 921) and said side gears (835, 837; 939, 941), respectively; a radially inward end thereof (880, 884; 977a, 978a) communicating with one of said helical oil passages and a radially outward end thereof (887, 889; 977b, 978b) communicating with a sliding portion between said side gear and an inner wall surface of said differential casing, respectively.

Further, the radially outward ends (887, 889) of said radial oil passages (881, 885) are formed at positions to communicate with sliding portions between said side gears and said differential casing and further at positions as to correspond to gearing portions between said pinion gears and said side gears, respectively.

Further, the radially outward ends (887, 889; 977b, 978b) of said radial oil passages (881, 885; 977, 978) are formed at positions as to communicate with sliding portions between said side gears and said differential casing and further at positions as to correspond to gearing portions between said pinion gears, respectively.

Further, the radially outward ends (889; 977b, 978b) of said radial oil passages (885; 977, 978) are formed at positions as to communicate with sliding portions between said side gears and said differential casing and further at positions as to correspond to sliding portions between end surfaces of said pinion gears and an inner wall surface of said differential casing, respectively.

Further, the radially outward ends (887, 889; 977b, 978b) of said radial oil passages (881, 885; 977, 978) are formed at positions as to communicate with mutual engaging portions between said pinion gears.

Further, said radial oil passages (881, 885; 977, 978) are formed for each mutually gearing pinion gear pair or for each pinion gear.

Further, said helical oil passages (877, 879; 9791, 979R) are formed in inner circumferential surfaces of boss portions (849, 851; 935, 934) of said differential casing or outer circumferential surfaces of two output shafts, respectively; and said radial oil passages are formed in said differential casing or said side gears, respectively so to extend radially outward.

Further, said helical oil passages (877, 979; 9791, 979R) are helical oil grooves formed in inner circumferential surfaces of the boss portion (849, 951; 935, 934) of said differential casing (821, 921), respectively in such a way as to be inclined by an inclination angle in a direction that lubricant can be introduced from an outside oil reservoir into said differential casing when said differential casing is rotated; said radial oil passages (881, 885; 977, 978) are formed in said differential casing in such a way that one ends thereof communicate with the helical oil passages, respectively and the other ends thereof extend radially outward. Said differential casing is formed with openings (893, 895, 897; 980, 981) communicating between the inside and outside of said differential casing at positions further radially outward away from the other ends of said radial oil passages, two oil circulation passages are formed by way of said two helical oil passages, said two radial oil passages, the accommodation holes of said differential casing and the openings, respectively to circulate lubricant by centrifugal force generated by rotation of said differential casing.

As described above, the first aspect of the present invention provides the following effects:

The oil sump or the oil sumps are formed between the thrust block member (for centering the two side gears) and the two side gears, respectively, and further the lubricant stored in the oil sumps can be supplied to the centering sliding portions of the thrust block member (i.e., between the two helical side gears) and to the two opposing end surface portions of the two side gears by a centrifugal force generated by the two side gears. Consequently, the two helical side gears are lubricated sufficiently, so that it is possible to obtain a stable differential limiting force.

The lubricant stored in the oil sumps is moved radially outward by a centrifugal force of the side gears. Consequently, lubricant is sucked from the outside of the differential apparatus inwardly along the spline portions between the two side gears and the two output shafts respectively, so that fretting corrosion can be prevented at the spline portions. As a result, it is possible to move the two side gears smoothly in the axial direction thereof.

The two helical side gears can be centered by the thrust block member. Consequently, it is unnecessary to form two different shaped centering portions in the two helical side gears; that is, the two side gears can be of the same shape and used interchangeably, so that it is possible to reduce the number of parts of the differential apparatus.

The lubricant passage is formed within the differential casing by way of the helical oil grooves formed in the inner circumferential surfaces of the two boss portions of the differential casing, the axial oil grooves formed at the spline portions between the two side gears and the two output shafts, and the oil sumps formed by the thrust block, the accommodation holes for housing the pinion gears, and the openings formed in the differential casing. Consequently, it is possible to improve the lubrication effect markedly.

The thrust block member is used for forming the oil sumps and for locating the axial positions of the output shafts in common. Consequently, it is possible to reduce the number of parts of the differential apparatus.

The outer diameter of the oil sumps is formed larger than the inner diameter of the boss portions of the two helical side gears, respectively. Consequently, a great amount of lubricant can be allowed to flow into the oil sumps effectively by a centrifugal force of the two side gears, so that it is possible to improve the lubrication effect more effectively.

The second aspect of the present invention provides the following effects:

An oil passage can be securely formed at the centering portion at which the two side gears are fitted to each other. Consequently, it is possible to provide an oil flow from the inner circumferential side to the outer circumferential side of the boss portions of the two side gears, so that the sliding portions and the gear portions of various gears can be lubricated sufficiently.

A plurality of radially extending oil grooves (whose number is the same as that of the pinion gear pairs) are formed in the centering portion of the two side gears at regular angular intervals and at such positions where the pinion gear pairs are arranged. Consequently, it is possible to provide an oil flow from the inner circumferential side to the outer circumferential side of the boss portions of the two side gears, so that pinion gears can be lubricated sufficiently between the gearing portions and the sliding portions with the inner wall surfaces of the differential casing.

At least one radially or axially extending oil groove is formed in any one of the end surfaces of the annular projecting and recessed portions of the side gears. Consequently, it is possible to provide an oil flow from the inner circumferential side to the outer circumferential side of the boss portions of the two side gears, so that the fitting portions and the sliding portions of various gears can be lubricated sufficiently.

The third aspect of the present invention provides the following effects:

The helical oil grooves are formed between the inner circumferential surfaces of the boss portions of the differential casing and the outer circumferential surfaces of the output shafts respectively, and further the radial oil passages are formed between the two side gears and the differential casing, respectively in such a way that the radially inward ends thereof communicate with the ends of the helical oil grooves and further with the sliding portions between the side gears and the inner walls of the differential casing respectively. Consequently, lubricant introduced from the oil reservoir due to the rotation of the differential casing can be supplied to the sliding portions between the side gears and the differential casing, so that it is possible to prevent seizure at these sliding portions and thereby a stable differential limiting force can be obtained.

The radially outward ends of the radial oil passages are located at the gearing portions between the pinion gears and the side gears. Consequently, it is possible to prevent seizure and gall at the sliding portions between the side gears and the differential casing, the gearing portions between the pinion gears and the side gears, and the sliding portions between the pinion gears and the accommodation holes of the differential casing. Further, when the pinion gears and the side gears are being rotated, lubricant can be supplied to the sliding portions between the side gears and the differential casing due to the pumping action of the pinion and side gears, and it is possible to prevent seizure and gall at the sliding portions.

DETAILED DESCRIPTION OF THE EMBODIMENTS

A first aspect of the differential apparatus according to the present invention will be described hereinbelow with reference to the attached drawings. The feature of the first aspect of the present invention is to provide a centering thrust block member in two inner circumferential surfaces of the two side gears in such a way that at least one oil sump can be formed between the thrust block member and the two side gears.

A first embodiment of the first aspect will be described hereinbelow with reference to FIGS. 8A to 8C.

Figure 8A:
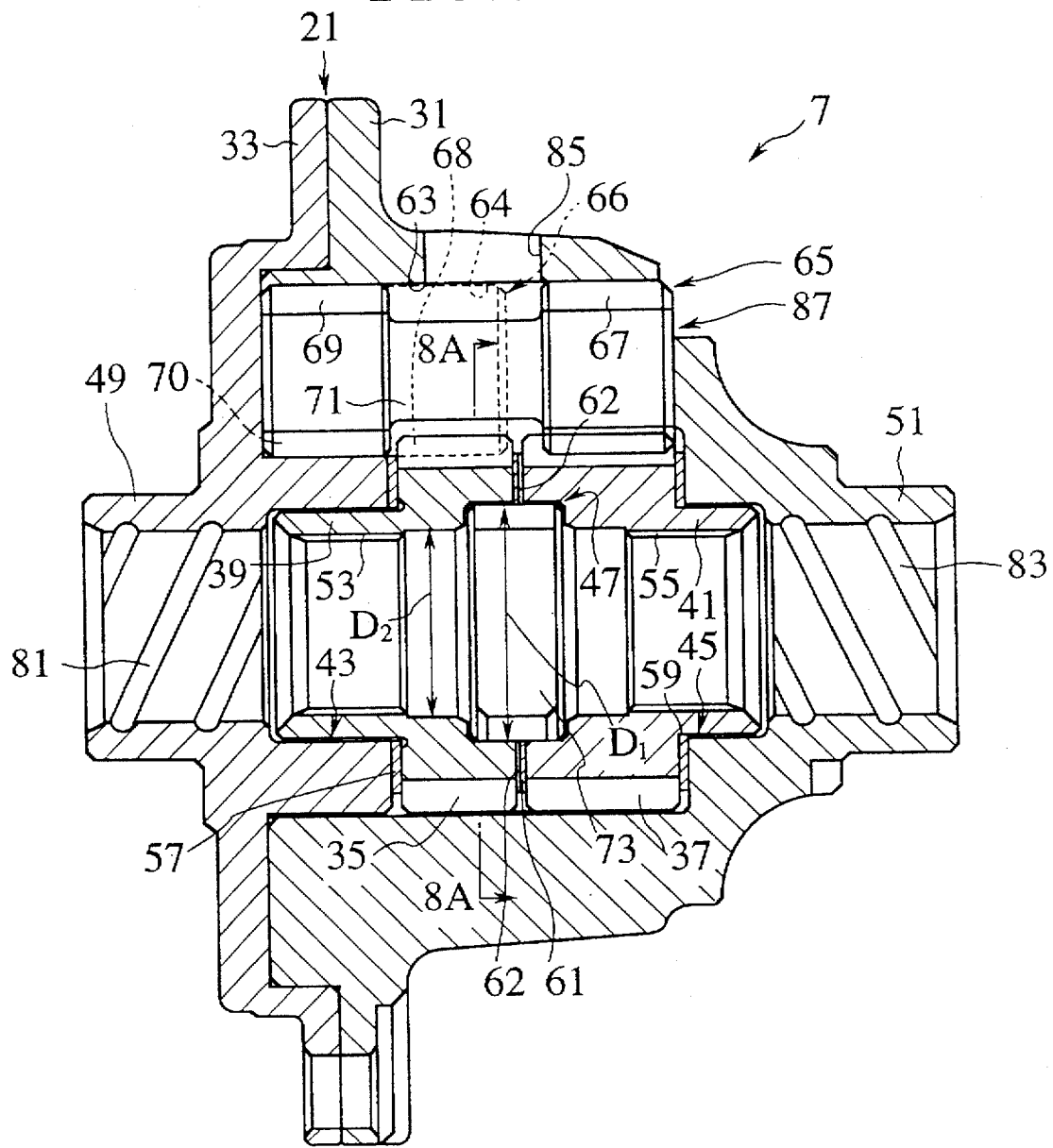
FIG. 8A is a cross-sectional view showing a first embodiment of the differential apparatus of the first aspect of the present invention.

In FIG. 8A, a differential casing 21 driven by an engine is composed of a casing body 31 and a cover 33 fixed to the casing body 31 with bolts. Within the differential casing 21, a pair of left and right helical side gears 35 and 37 are arranged in such a way that two hollow boss portions 39 and 41 of the two side gears 35 and 37 are rotatably supported by two support portions 43 and 45 of the differential casing 21, respectively. Between the two inner end surfaces of the two side gears 35 and 37, a thrust block (a block member) 47 as shown in FIG. 8B is interposed in such a way as to extend along two inner circumferential surfaces of the two side gears 35 and 37 and to support the respective free ends of the two side gears 835 and 837 for centering (alignment).

Left and right output shafts (not shown) are passed through two boss portions 49 and 51 of the differential casing 21 and further spline-coupled with two spline portions 53 and 55 of the two side gears 35 and 37, respectively. Two thrust washers 57 and 59 are interposed between two inner wall surfaces of the differential casing 21 and the two side gears 35 and 37, respectively. Further, a thrust washer 61 formed with a plurality of radially extending grooves 62 on both side surfaces thereof, respectively is disposed between the inner end surfaces of the two side gears 35 and 37 in contact with the outer circumferential surface of the thrust block 47.

The differential casing 21 is formed with a plurality of pairs of a long accommodation hole 63 and a short accommodation hole 64, which are arranged at regular angular intervals in the circumferential direction of the differential casing 21. A long helical pinion gear 65 is slidably and rotatably housed in each of the long accommodation holes 63, and a short helical pinion gear 66 is slidably and rotatably housed in each of the short accommodation holes 64, respectively.

Each long helical pinion gear 65 is formed with a first gear portion 67, a second gear portion 69, and a small diameter axle portion 71 for connecting these two gear portions 67 and 69. The first gear portion 67 of the long helical pinion gear 65 is in mesh with the right side gear 37. On the other hand, the short helical pinion gear 64 is formed with first gear portion 68 and a second gear portion 70. The first gear portion 68 of the short helical pinion gear 64 is in mesh with the left side gear 35, and the second gear portion 70 of the short helical pinion gear 64 is in mesh with the second gear portion 69 of the long helical pinion gear 65.

In operation, an engine power is transmitted to the differential casing 21. When the differential casing 21 is rotated, the engine power is distributed to the left and right output shafts via the two long and short helical pinion gears 65 and 64 and the two side gears 35 and 37, respectively. In more detail, when a difference in driving resistance is produced between the two output (wheel drive) shafts (as example, during travel on a muddy road), since the long and short helical pinion gears 65 and 64 are rotated on their own axes, respectively, an engine drive power can be distributed differentially to the left and right wheels, appropriately.

When an engine torque is being transmitted, since the respective helical pinion gears 65 and 64 are brought into pressure contact with the wall surfaces of the respective accommodation holes 63 and 64 due to reaction force generated by gearing between the respective long and short helical pinion gears 65 and 64 and the two side gears 35 and 37, respectively, a frictional resistance is generated. Further, since the end surfaces of the respective long and short helical pinion gears 65 and 64 are brought into contact with the inner wall surfaces of the differential casing 21 due to thrust force generated between the long and short helical pinion gears 65 and 64, another frictional resistance is generated. In addition, another frictional resistance is generated between the two inner end surfaces of the two side gears 35 and 37 via the thrust washer 61 or between the respective side gears 37 and 37 and the differential casing 21 via the thrust washers 57 and 59, respectively. On the basis of these frictional resistances, it is possible to obtain a differential limiting function of torque sensitive type.

Figure 8B:
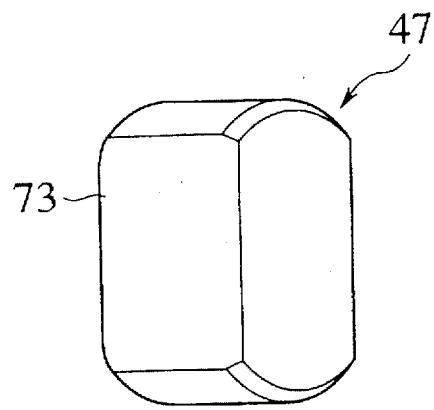
FIG. 8B is a perspective view showing a thrust block used for the first embodiment of the differential apparatus shown in FIG. 8A.
Figure 8C:
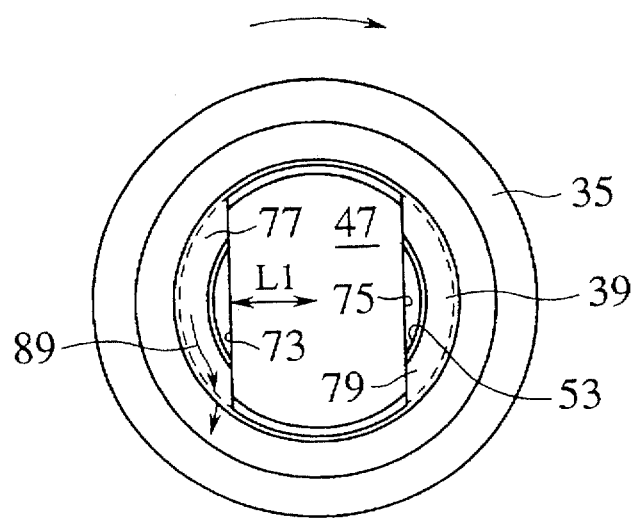
FIG. 8C is a partial cross-sectional view showing the first embodiment, taken along the line 8A—8A in FIG. 8A.

As depicted in FIGS. 8B and 8C, the thrust block 47 is formed into an elongated oblong shape in such a way that two parallel cutout portions 73 and 75 are formed on both radially outward sides thereof to extend in the axial direction thereof. Therefore, two oil sumps 77 and 79 (See FIG. 8C) are formed between the two cutout portions 73 and 75 of the thrust block 47 and the inner circumferential surfaces of the two side gears 35 and 37, respectively.

Further, as shown in FIG. 8A, two helical oil grooves 81 and 83 are formed in the inner circumferential surfaces of the two boss portions 49 and 51 of the differential casing 21 (i.e., the cover 33 and the casing body 31), respectively. Further, some axial oil grooves are formed at the spline portion 53 between the inner circumferential surface of the boss portion 39 of the left side gear 35 and the outer circumferential surface of the left output shaft, by cutting off some spline teeth. These grooves communicate with the helical oil groove 81 formed in the cover 33. In the same way, some axial oil grooves are formed at the spline portion 55 between the inner circumferential surface of the boss portion 41 of the right side gear 37 and the outer circumferential surface of the right output shaft, by cutting off some spline teeth so as to communicate with the helical oil groove 83 formed in the casing body 31. Therefore, the two helical oil grooves 81 and 83 communicate with the two inner oil sumps 77 and 79 through the respective axial oil grooves formed at the spline portions 53 and 55, respectively. Further, the thrust washer 61 interposed between the two inner end surfaces of the two side gears 35 and 37 is formed with radially extending grooves 62 on both side surfaces thereof. Further, the differential casing 21 is formed with openings 85 and 87.

As a result, it is possible to form a circulating oil passage in the differential casing 21, by way of the outside, the helical oil grooves 81 and 83 of the boss portions 49 and 51 of the casing body 31, the axial oil grooves formed at the spline portions 53 and 55 between the side gears and the output shafts, the two oil sumps 77 and 79 of the thrust block 47, the radial grooves 62 formed in the washer 62, the accommodation holes 63 and 64 of the differential casing 21, the two openings 85 and 87 of the differential casing 21, and the outside of the differential casing 21.

Accordingly, when the differential casing 21 is rotated, since lubricant stored in a differential carrier (not shown) for accommodating the differential casing 21 is thrown and introduced into the two oil sumps 77 and 79 formed on both sides of the thrust block 47 through the two helical oil grooves 81 and 83 of the differential casing 21 and the cut-off spline portions 53 and 55 between the two output shafts and the two side gears 35 and 37, respectively. Accordingly, the introduced lubricant can sufficiently lubricate the thrust block 47 at which the two side gears 35 and 37 are centered and slid with respect to each other. In addition, the lubricant introduced into the two oil sumps 77 and 79 is moved radially outward due to a centrifugal force of the two side gears 35 and 37 along the radial grooves 62 formed in the thrust washer 61 sandwiched between the two end surfaces of the two side gears 35 and 37, as shown by an arrow 89 shown in FIG. 8C. Thus, it is possible to sufficiently lubricate the sliding portion between the two side gears 35 and 37, the gearing portions between the two side gears 35 and 37 and the pinion gears 65 and 66, and the sliding portions between the pinion gears 65 and 66 and the inner wall surfaces of the differential casing 21, respectively. After having lubricated the gearing and sliding portions, the lubricant is exhausted to the outside through the two openings 85 and 87 formed in the differential casing 21 due to the centrifugal force of the respective gears. The lubricant is then returned to the oil reservoir of the differential carrier.

As described above, in the differential apparatus according to the present invention, since secure lubricant circulating passages are formed within the differential casing 21, lubricant can flow reliably through the differential apparatus, so that sufficient lubricant is supplied to the respective sliding and gearing portions which require lubrication.

Further, the above-mentioned embodiment can be modified in various ways, without being limited only the above-mentioned structure. For instance, instead of the radially extending grooves 62 formed in the thrust washer 61, it is possible to form similar grooves on the inner end surfaces of the two side gears 35 and 37, respectively. Further, the shape of the grooves are not limited only to radial grooves, as long as the lubricant can be moved along the thrust washer 61 due to the centrifugal force of the two side gears 35 and 37. Further, since the two side gears 35 and 37 receive a thrust force generated by the gearing with the two long and short helical pinion gears 65 and 66, and thereby move in the axial direction thereof, even if the grooves 62 are not formed in the sliding surfaces of the thrust washer 61, the lubricant can enter the gap of the sliding portions between the thrust washer 62 and the two side gears 35 and 37 due to the centrifugal force of the two side gears.

Further, as shown in FIG. 8A, the outer diameter D1 of the oil sumps 77 and 79 is preferably larger than the inner diameter D2 of the boss portions 39 and 41 of the two side gears 35 and 37. Accordingly, a sufficient amount of lubricant can be held at the two oil sumps 77 and 79, respectively. Further, since a sufficient amount of lubricant can be introduced into the oil sumps 77 and 79 (formed by a difference (D1–D2) in diameter between the thrust block 47 and the boss portions 39 and 41) through the cut-off spline portions 53 and 55 owing to the centrifugal force of the side gears 35 and 37, it is possible to effectively increase the lubrication effect of the respective sliding and gearing portions.

Furthermore, since the width (2×L1) (See FIG. 8C) of the thrust block 47 is preferably shorter than the inner diameter D2 (See FIG. 8A) of the boss portion 39 or 41 of the side gear (i.e., D2/2>L1), it is possible to smoothly flow lubricant from the cut-off spline portions 53 and 55 to the oil sumps 77 and 79, respectively.

As described above, in the differential apparatus 7 shown in FIGS. 8A to 8C, due to the two oil sumps 77 and 79, the sliding portions between the thrust washer 61 and the two side gears 35 and 37 are sufficiently lubricated, so that it is possible to prevent seizure at the relatively sliding portions therebetween. Further, since the lubricant circulating passage is securely formed between the inside and the outside of the differential casing 21, the lubricant flows smoothly to improve the lubrication efficiency at various sliding and gearing portions.

Further, since the amount of lubricant held at the oil sumps 77 and 79 can be increased by providing a difference in inner diameter (D1–D2) between the oil sumps 77 and 79 and the boss portions 39 and 41 of the two side gears 35 and 37, it is possible to improve the lubrication effect more reliably.

As described above, when the various sliding portions such as the centering portions between the two side gears 35 and 37 by the thrust block 47 and the sliding portions between the thrust washer 61 and the two side gears 35 and 37 can be sufficiently lubricated without causing any seizure, it is possible to obtain a stable differential limiting force of the differential apparatus 7.

Further, since the spline portions between the output shafts and the two side gears 35 and 37 can be sufficiently lubricated by the circulating lubricant, it is possible to prevent the generation of cracks due to fretting corrosion caused at the spline portions. In addition, the two side gears 35 and 37 can be moved in the axial direction smoothly due to the sufficient lubrication. Thus, whenever the two side gears 35 and 37 receive an outward gearing thrust force, respectively in the opposite direction, the two side gears can be moved toward the thrust washers 57 and 59, that is, toward the inner wall surfaces of the differential casing 21, so that a normal differential limiting force can be also obtained.

Further, since a common thrust block 47 for locating the two output shafts formed with two cutout portions for forming the two oil sumps 77 and 79, it is possible to advantageously reduce the number of parts of the differential apparatus.

Figure 1:
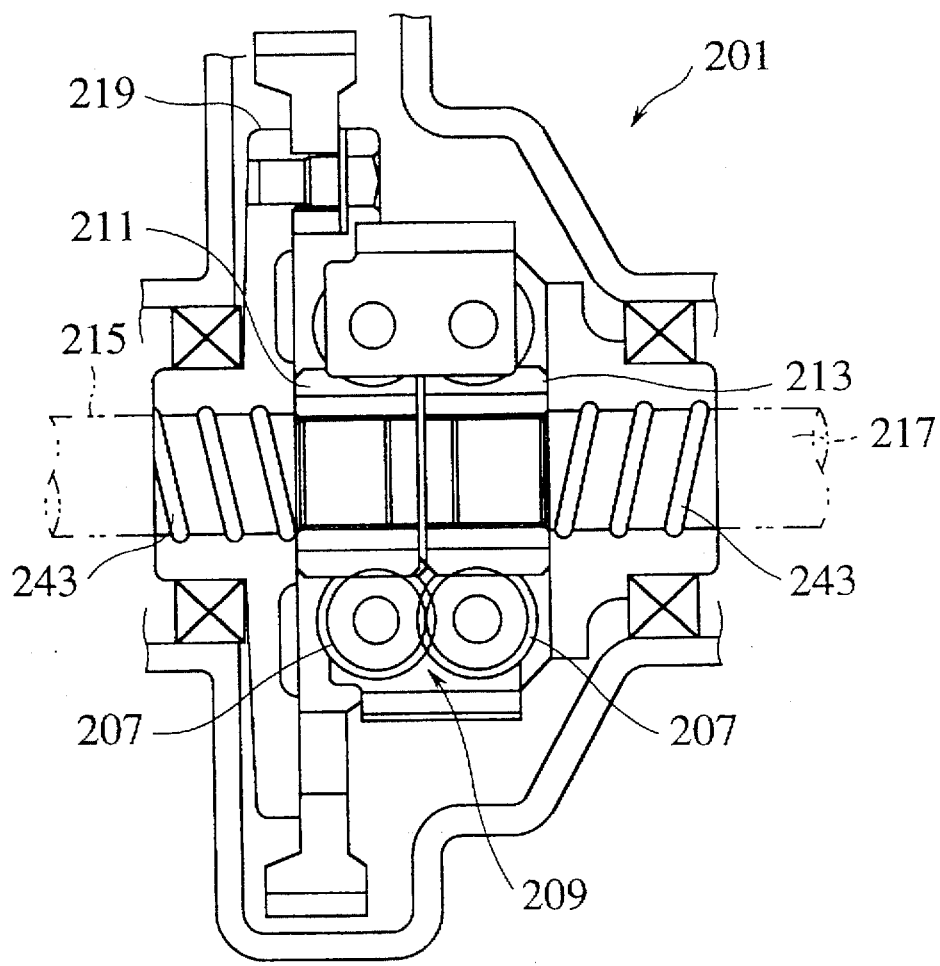
FIG. 1 is a cross-sectional view showing a first example of prior art differential apparatus related to the first aspect of the present invention.
Figure 2:
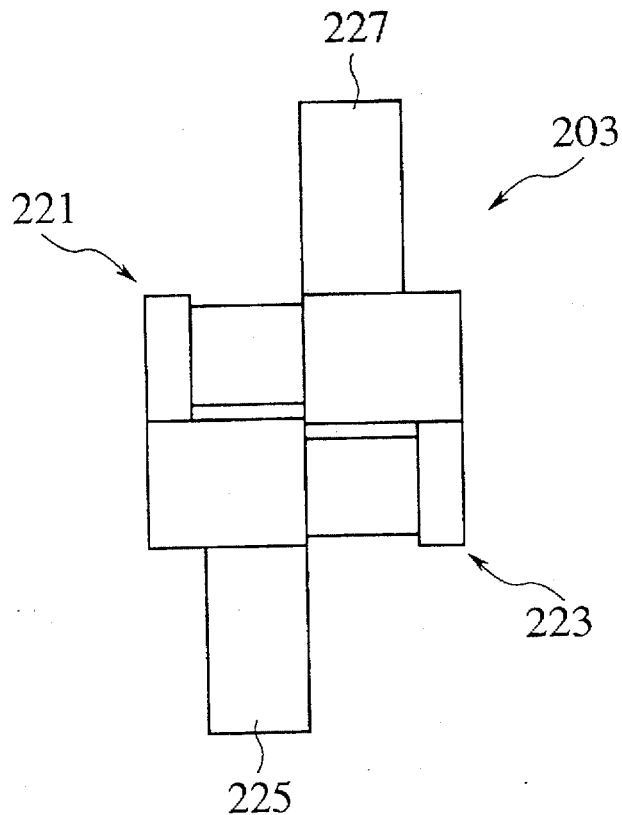
FIG. 2 is a cross-sectional view showing a second example of prior art differential apparatus related to the first aspect of the present invention.
Figure 3:
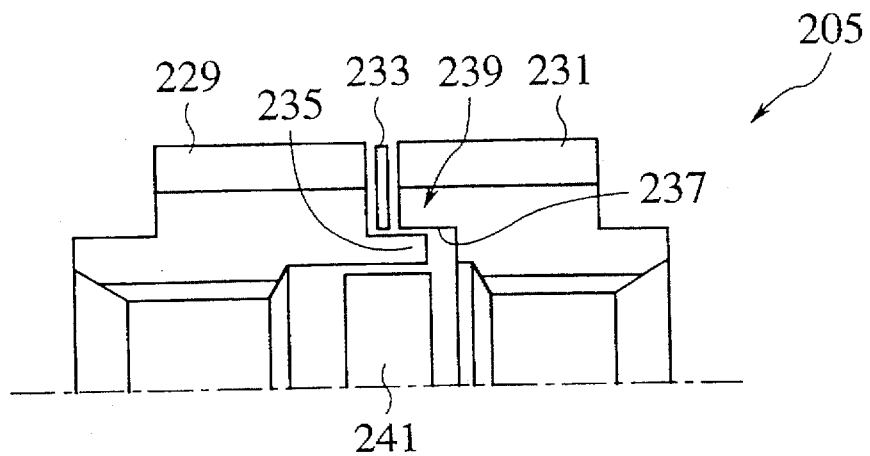
FIG. 3 is a cross-sectional view showing a third example of prior art differential apparatus related to the first aspect of the present invention.
Figure 4A:
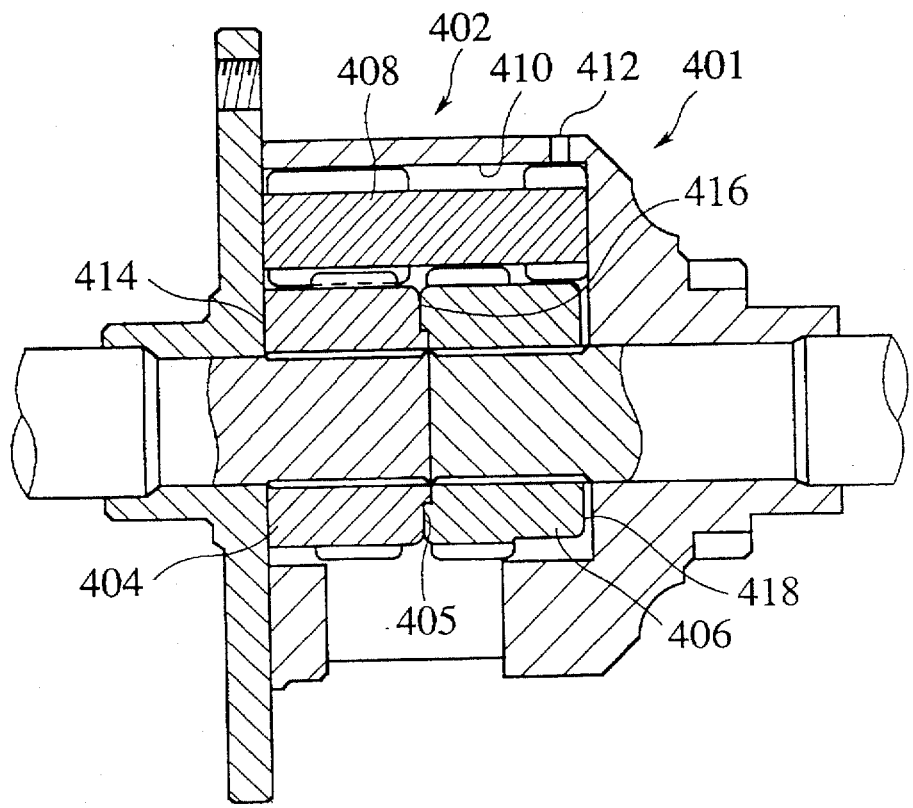
FIG. 4A is a cross-sectional view showing a fourth example of prior art differential apparatus related to the second aspect of the present invention.
Figure 4B:
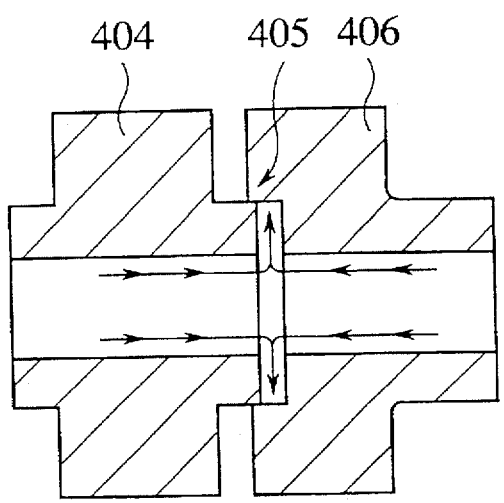
FIG. 4B shows only a lubricant flow passage of the same differential apparatus.
Figure 5:
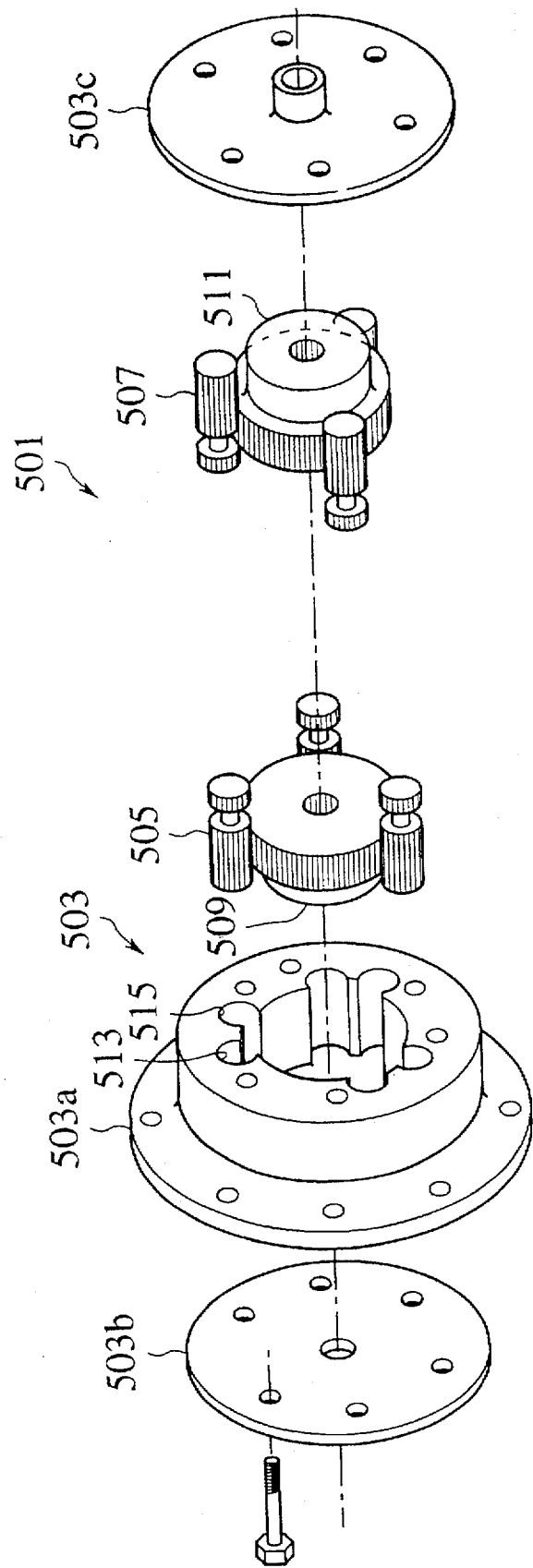
FIG. 5 is a cross-sectional view showing a fifth example of prior art differential apparatus related to the third aspect of the present invention.
Figure 6:
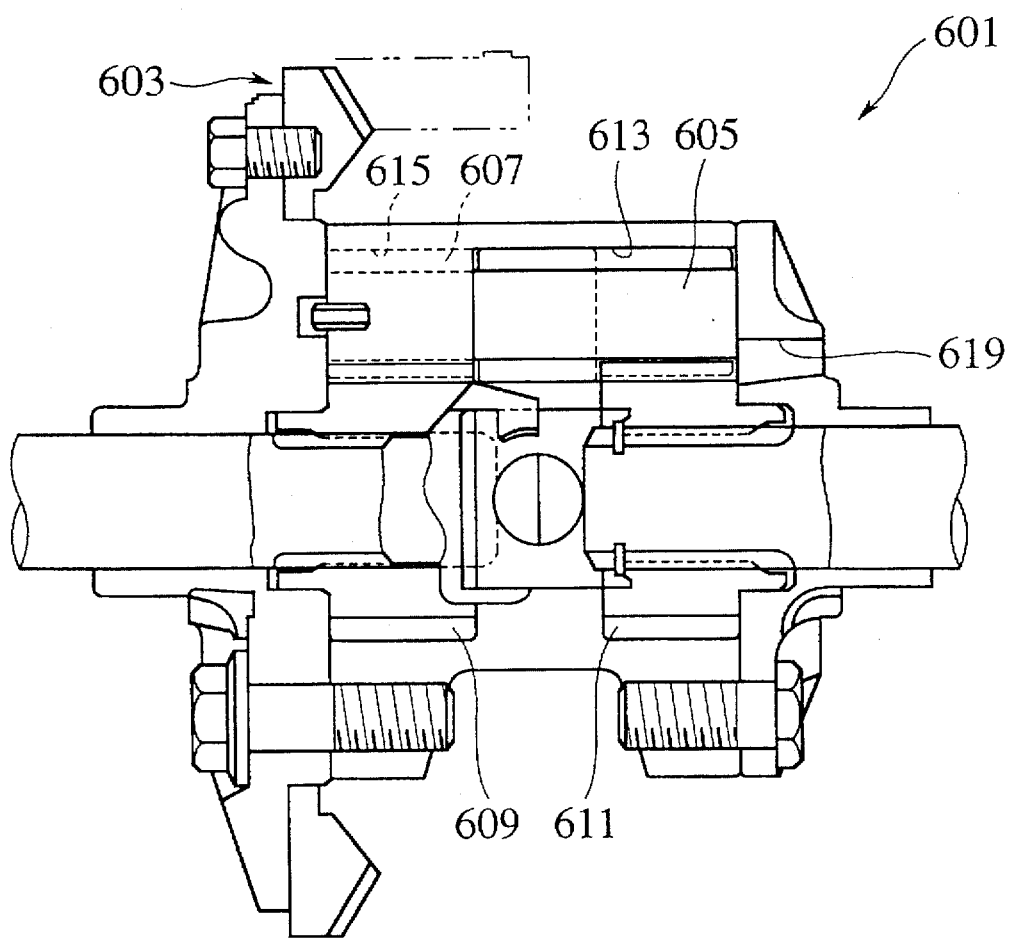
FIG. 6 is a cross-sectional view showing a sixth example of prior art differential apparatus related to the third aspect of the present invention.
Figure 7A:
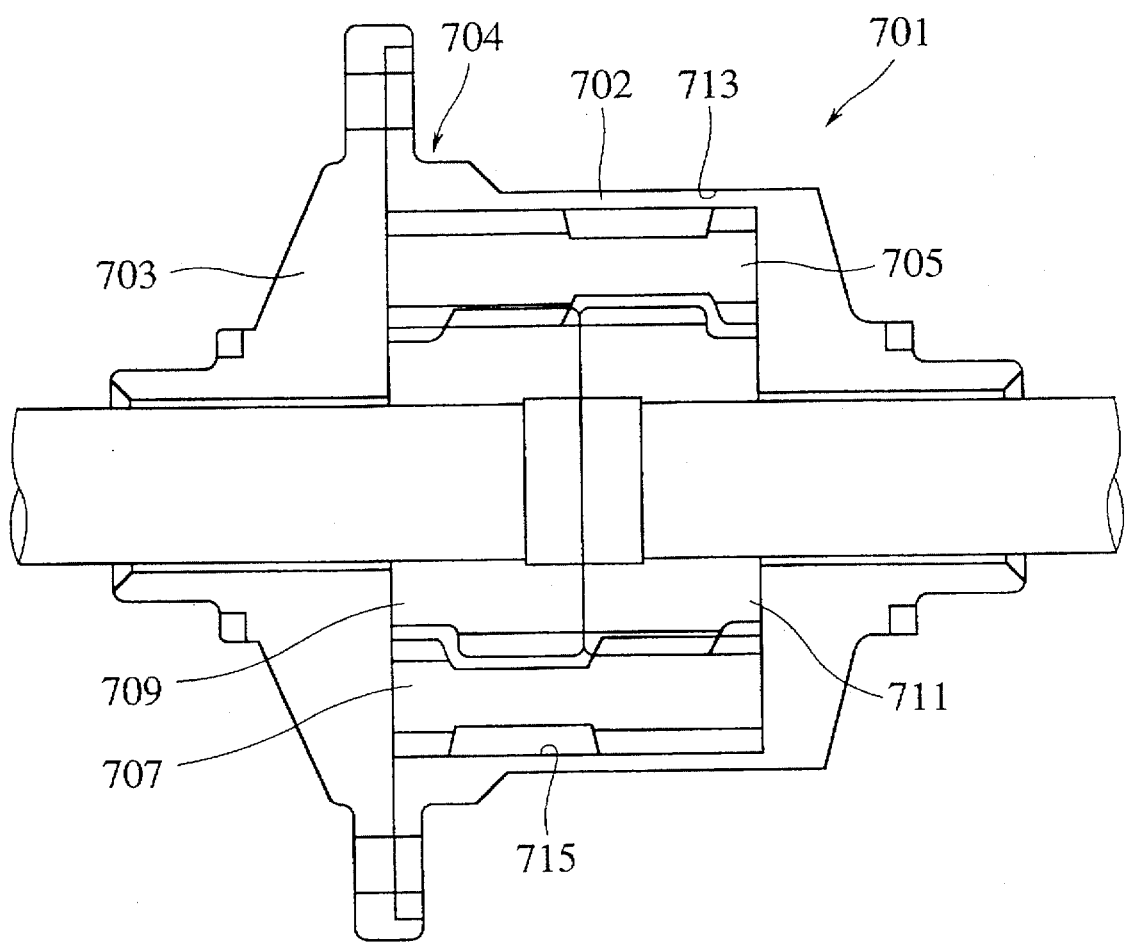
FIG. 7A is a cross-sectional views showing a seventh example of prior art differential apparatus related to the third aspect of the present invention.
Figure 7B:
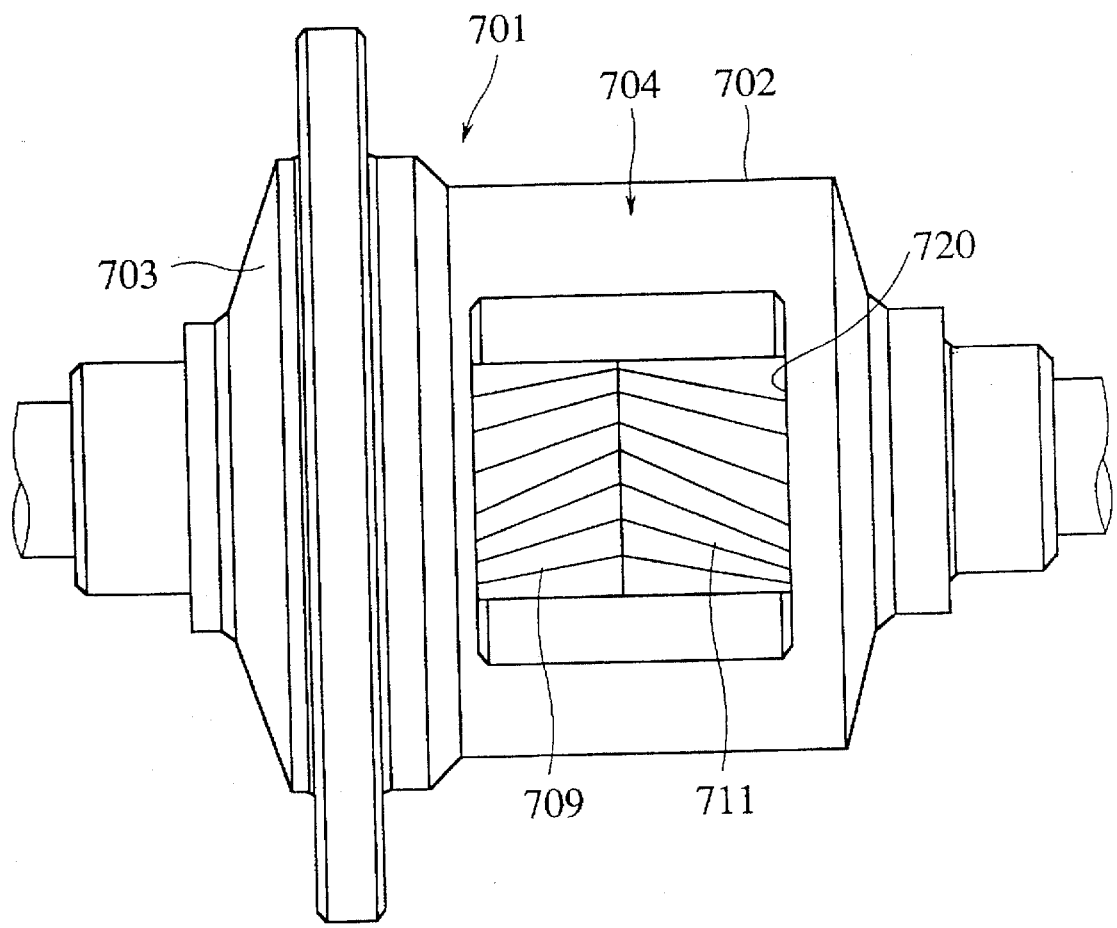
FIG. 7B is an external views showing the seventh example of prior art differential apparatus shown in FIG. 7A.

In addition, since the two side gears 35 and 37 are centered for alignment by the thrust block 47, it is unnecessary to form two different centering portions between the two side gears 35 and 37, which is different from the third prior art example shown in FIG. 3. As a result, it is possible to form the two side gears 35 and 37 in common, so that the number of elements of the differential apparatus is reduced.

Further, the two flat cutout surfaces of the thrust block 47 can be machined easily by use of a milling machine. Here, however, it is possible to form three or more cutout portions at regular angular intervals in the outer circumferential surface of the thrust block 47, without being limited only to the two cutout portions 73 and 75.

Further, since the two side gears 35 and 37 can be aligned securely by the thrust block 47 and since two large volumes can be obtained as the oil sumps 77 and 79, sufficient lubrication can be obtained and thereby the differential limiting force can be stabilized.

A second embodiment of the first aspect according to the present invention will be described hereinbelow with reference to FIGS. 9A to 9B, in which the same reference numerals have been retained for similar elements having the same functions as with the case of the first embodiment, without repeating the similar description thereof.

Figure 9A:
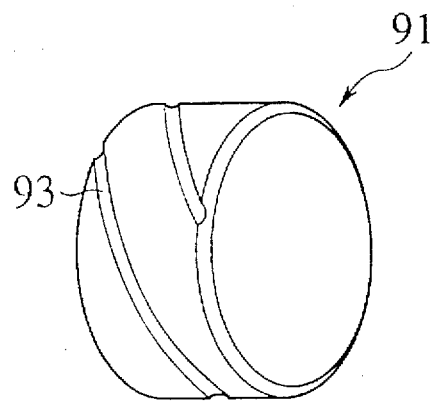
FIG. 9A is a perspective view showing a thrust block used for a second embodiment of the differential apparatus of the first aspect of the present invention.
Figure 9B:
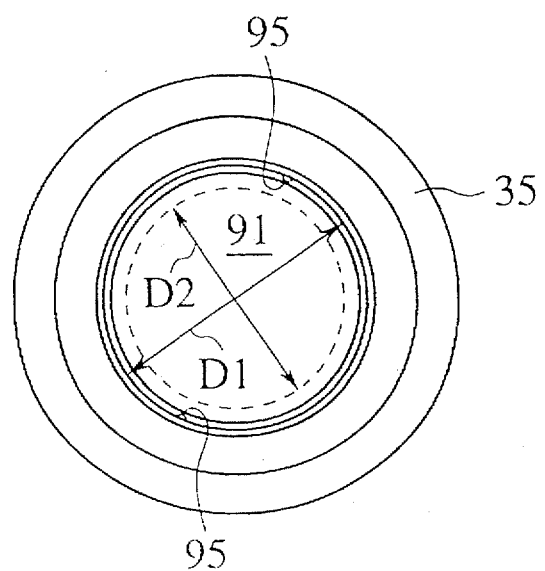
FIG. 9B is a partial cross-sectional view showing the second embodiment, taken along the line 8A—8A shown in FIG. 8A.

FIG. 9A shows a thrust block (block member) 91 used for the second embodiment. This thrust block 91 supports the inner circumferential surfaces of the boss portions 39 and 41 of the two side gears 35 and 37, respectively in such a way that the two side gears 35 and 37 can be centered with each other, in the same way as the thrust block 47.

Thrust block 91 is formed with a helical groove 93 on the outer circumferential surface thereof to form an oil sump 95 between the thrust block 91 and the inner circumferential surfaces of the boss portions 39 and 41 of the two side gears 35 and 37. The outer diameter D1 of the oil sump 95 is preferably larger than the inner diameter D2 of the boss portions 39 and 41 of the two side gears 35 and 37. FIG. 9B shows the oil sump 95 formed between the thrust block 91 and the side gear 35.

When the differential casing 21 is rotated, lubricant is introduced into the oil sump 95 from the outside along the two helical oil grooves 81 and 83 formed in the inner circumferential surfaces of the boss portions 49 and 51 of the differential casing 21 and along the cutoff spline portions formed between the two side gears 35 and 37 and the left and right output shafts. Therefore, the lubricant stored in the oil sump 95 lubricates the centering sliding portions between the thrust block 91 and the two side gears 35 and 37 for prevention of seizure. Further, the lubricant stored in the oil sump 95 is moved radially outward due to a centrifugal force of the side gears 35 and 37 to lubricate the two opposing inner end surfaces of the two side gears 35 and 37 for prevention of seizure, so that it is possible to stabilize the differential limiting force. In this case, since there exists a difference (D1−D2) between the outer diameter of the thrust block 91 and the inner diameter of the boss portions 39 and 41 of the side gears 35 and 37, lubricant can be introduced smoothly into the oil sump 95 of the thrust block 91. Further, due to the helical shape of groove 93 of the thrust block 91, when the differential casing 21 is rotated, lubricant is moved axially inward from both sides along the helical groove 93, so that the centering sliding portions can be lubricated more effectively.

In this oil flow, since the spline portions between the two side gears 35 and 37 and the output shafts can be lubricated sufficiently, the fretting corrosion at the two side gears is prevented, with the result that the two side gears 35 and 37 can be moved smoothly in the axial direction.

Further, since a single thrust block 91 can be used for locating the axial positions of the two output shafts and as a block member for providing an oil sump 95, it is possible to advantageously reduce the number of parts of the differential apparatus.

In addition, since the two side gears 35 and 37 are centered by the thrust block 91, it is unnecessary to form two different (projecting and recessed) centering portions in the two side gears 35 and 37, which is different from the third prior art example shown in FIG. 3. As a result, it is possible to form the two side gears 35 and 37 identically, so that the number of elements of the differential apparatus can be reduced.

A third embodiment of the first aspect according to the present invention will be described hereinbelow with reference to FIGS. 10A to 10B, in which the same reference numerals have been retained for similar elements having the same functions as with the case of the first embodiment, without repeating the similar description thereof.

Figure 10A:
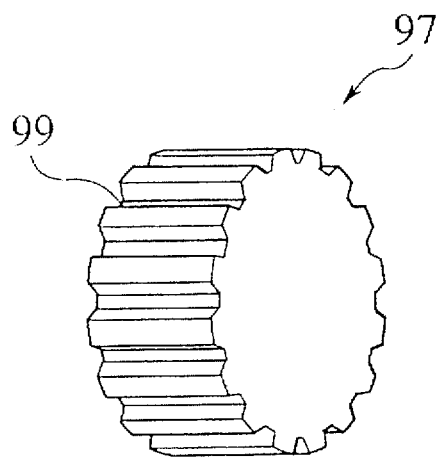
FIG. 10A is a perspective view showing a thrust block used for a third embodiment of the differential apparatus of the first aspect of the present invention.
Figure 10B:
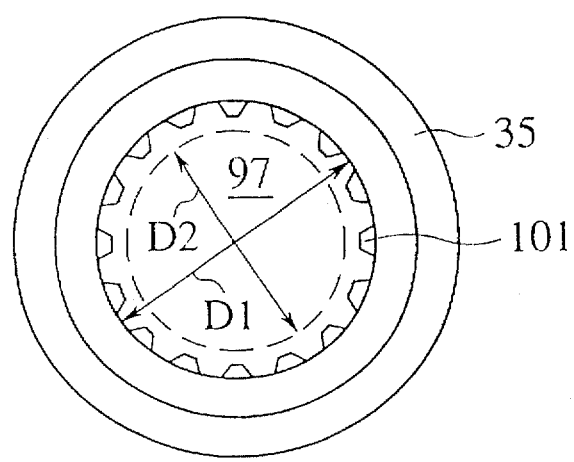
FIG. 10B is a partial cross-sectional view showing the third embodiment, taken along the line 8A—8A shown in FIG. 8A.

FIG. 10A shows a thrust block (block member) 97 used for the third embodiment. This thrust block 97 supports the inner circumferential surfaces of the boss portions 39 and 41 of the two side gears 35 and 37, respectively in such a way that the two side gears 35 and 37 can be centered with each other, in the same way as the thrust block 47.

Thrust block 97 is formed with a plurality of axial grooves 99 arranged at regular angular intervals in the outer circumferential surface of the thrust block 97 to form a plurality of axially extending oil sumps 101 between the thrust block 97 and the inner circumferential surfaces of the two side gears 35 and 37. The outer diameter D1 of the oil sumps 101 is preferably larger than the inner diameter D2 of the boss portions 39 and 41 of the two side gears 35 and 37. FIG. 10B shows the oil sumps 101 formed between the thrust block 97 and the side gear 35.

When the differential casing 21 is rotated, lubricant is introduced into the oil sumps 101 from the outside along the two helical oil grooves 81 and 83 formed in the inner circumferential surfaces of the boss portions 49 and 51 of the differential casing 21 and along the cutoff spline portions formed between the two side gears 35 and 37 and the left and right output shafts. Therefore, the lubricant stored in the oil sumps 101 can lubricate the centering sliding portions between the thrust block 97 and the two side gears 35 and 37 for prevention of seizure. Further, the lubricant stored in the oil sumps 101 is moved outward due to a centrifugal force of the side gears 35 and 37 to lubricate the two opposing inner end surfaces of the two side gears 35 and 37 for prevention of seizure, so that it is possible to stabilize the differential limiting force. In this case, since there exists a difference (D1−D2) between the outer diameter of the thrust block 97 and the inner diameter of the boss portions 39 and 41 of the side gears 35 and 37, lubricant can be introduced smoothly into the oil sumps 101 of the thrust block 97. Further, since the axial grooves 99 of the thrust block 97 are formed all over the outer circumferential surface of the thrust block 97, lubricant can be supplied uniformly to the two opposing end surfaces of the two side gears 35 and 37. Thus, it is possible to prevent the thrust block 97 from being worn off locally.

Further, since the oil sumps 101 are formed by the axial grooves 99 formed all over the surface of the thrust block 97, a large amount of lubricant can be stored and thereby the lubrication effect can be increased sufficiently. Further, since the axial grooves 99 can be machined easily by punching out the thrust block 97, the manufacturing cost of the thrust block 97 is relatively low.

In the above-mentioned oil flow, since the spline portions between the two side gears 35 and 37 and the two output shafts can be lubricated sufficiently, the fretting corrosion at the two side gears can be prevented. Thus, the two side gears 35 and 37 can be moved in the axial direction smoothly.

Further, since a single thrust block 97 can be used for locating the axial positions of the two output shafts and as a block member for providing the oil sumps 101, it is possible to advantageously reduce the number of parts of the differential apparatus.

In addition, since the two side gears 35 and 37 are centered by the thrust block 97, it is unnecessary to form two different (projecting and recessed) centering portions in the two side gears 35 and 37, which is different from the third prior art example shown in FIG. 3. As a result, it is possible to form the two side gears 35 and 37 identically, so that the number of different elements of the differential apparatus can be reduced.

Further, in the above-mentioned embodiments, it is possible to directly slide the two inner end surfaces of the two helical side gears 35 and 37, without use of any thrust washer 61.

As described above, in the first aspect of the present invention, the following effects can be obtained.

(1) Since the oil sump or the oil sumps are formed between the thrust block member (for centering the two side gears) and the two side gears, respectively, and further since the lubricant stored in the oil sumps can be supplied to the centering sliding portions of the thrust block member (i.e., between the two helical side gears) and to the two opposing end surface portions of the two side gears by a centrifugal force generated by the two side gears, the two helical side gears can be lubricated sufficiently, so that it is possible to obtain a stable differential limiting force.

(2) Since lubricant stored in the oil sumps can be moved radially outward by a centrifugal force of the side gears, lubricant is sucked from the outside of the differential apparatus inward smoothly along the spline portions between the two side gears and the two output shafts respectively, so that the fretting corrosion can be prevented at the spline portions. As a result, it is possible to move the two side gears smoothly in the axial direction thereof.

(3) Since the two helical side gears can be centered by the thrust block member, it is unnecessary to form the two different shaped centering portions in the two helical side gears; that is, the two side gears of the same shape can be formed identically, so that it is possible to reduce the number of different parts of the differential apparatus.

(4) Since the lubricant passage is formed within the differential casing by way of the helical oil grooves formed in the inner circumferential surfaces of the two boss portions of the differential casing, the axial oil grooves formed at the spline portions between the two side gears and the two output shafts, and the oil sumps formed by the thrust block, the accommodation holes for housing the pinion gears, and the openings formed in the differential casing, it is possible to improve the lubrication effect markedly.

(5) Since the thrust block member is used for forming the oil sumps and for locating the axial positions of the output shafts in common, it is possible to reduce the number of parts of the differential apparatus.

(6) Since the outer diameter of the oil sumps is larger than the inner diameter of the boss portions of the two helical side gears, respectively, a great amount of lubricant can be allowed to flow into the oil sumps effectively by a centrifugal force of the two side gears, so that it is possible to improve the lubrication effect more effectively.

A second aspect of the differential apparatus according to the present invention will be described hereinbelow with reference to the attached drawings. The feature of the second aspect is to form at least one central oil passage at the centering portion between two side gears so as to extend from the inner circumferential side to the outer circumferential side of the two side gears.

A first embodiment of the second aspect will be described hereinbelow with reference to FIGS. 11A to 11E.

Figure 11A:
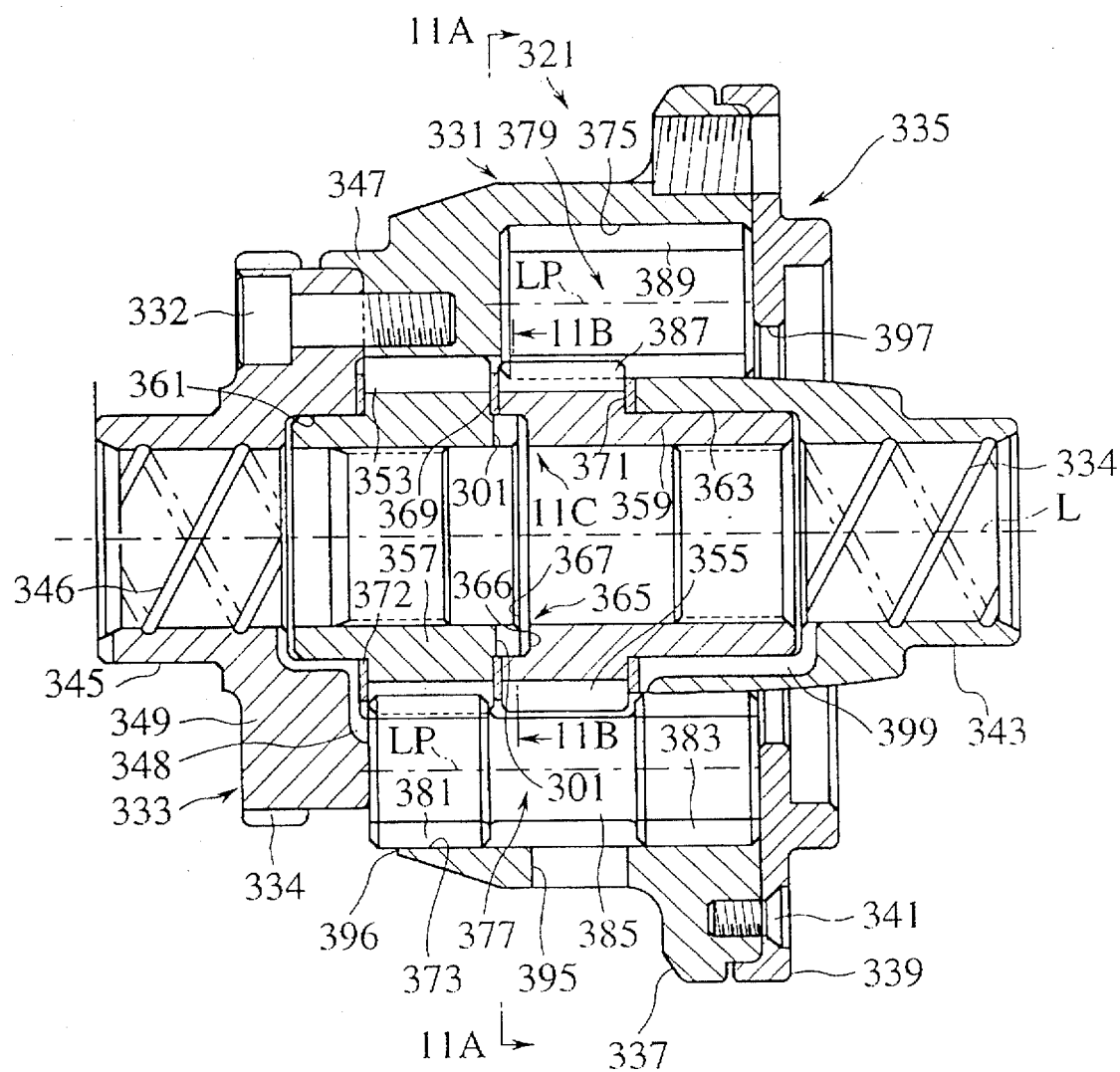
FIG. 11A is a cross-sectional view showing a first embodiment of the differential apparatus of the second aspect of the present invention.

In FIG. 11A, the differential apparatus has a differential casing 321 rotated around an axial line L by an engine power. The differential casing 321 is composed of a casing body 331, an end cover 333 fixed to the axially left side of the casing body 331, and a ring plate 335 fixed to the axially right side of the casing body 331.

The casing body 331 and the ring plate 335 are coupled to each other by fixing a flange portion 337 of the casing body 331 and a flange portion 339 of the ring plate 335 with screws 341. Further, although not shown, a ring gear is fixed to these casing body 331 and the ring plate 335 with a plurality of bolts. The casing body 331 is formed with a right side cylindrical boss portion 343 extending rightward and a side wall portion 347 extending leftward both along the axial line L. The end cover 333 is formed with a left side cylindrical boss portion 345 extending leftward and a side wall portion 349 extending leftward both along the axial line L. Therefore, the end cover 333 of the casing body 331 by fixing the mutually adjoining side wall portiota 349 of the end cover 333 and 347 by use of through bolts 332. Further, a speed meter gear 334 is fixed to the outer circumferential surface of the end cover 333. Further, a helical oil groove 344 is formed in an inner circumferential surface of the boss portion 343 of the casing body 331 to introduce lubricant into the differential casing 321 whenever the differential casing 321 is rotated by the engine. In the same way, another helical oil groove 346 is formed in an inner circumferential surface of the boss portion 345 of the end cover 333.

Within the differential casing 321, a pair of helical side gears 353 and 355 are disposed to be opposed to each other. The left side gear 353 is formed with a cylindrical boss portion 357 supported by a supporting portion 361 formed in the boss portion 345 of the end cover 333. The right side gear 355 is formed with a cylindrical boss portion 359 supported by a supporting portion 363 formed in the boss portion 343 of the casing body 331.

The left side gear 353 is formed with an annular projecting portion 366 projecting from an opposing end surface 357a (See FIG. 11E) (i.e., the sliding end portion of the boss portion 357) to construct a centering portion 365. On the other hand, the right side gear 355 is formed with an annular recessed portion 367 recessed from the same opposing end surface 359a (See FIG. 11E) (i.e., the sliding end portion of the boss portion 359) to construct the same centering portion 365. Accordingly, when a cylindrical fitting surface 366b (See FIG. 11E) of the projecting portion 366 is fitted to a cylindrical fitting surface portion 367b (See FIG. 11F) of the recessed portion 367, the two boss portions 357 and 359 of the two side gears 353 and 355 can be aligned or centered with each other. Further, as shown in FIG. 11F, a washer 369 is interposed between two end surfaces 357a and 359a of the two side gears 355 and 357 on the outer circumferential side of the annular protecting portion 366 of the left side gear 353 and the annular recessed portion 367 of the right side gear 355 In such a way that the inner circumferential surface of the washer 369 is brought into contact with the outer circumferential side of the annular projecting portion 366 of the left side gear 353. Therefore, the two side gears 353 and 355 can be rotated independently in such a way that the two end surfaces 357a and 359a thereof are slid with respect to each other via the washer 369. In summary, the two side gears 353 and 355 are rotatably supported independently and coaxially with the rotational axis L of the differential casing 321.

The two side gears 353 and 357 are spline coupled with two left and right output shafts at the boss portions 357 and 359 thereof, respectively. Some of spline teeth at the spline portions are cut off so as to form axial oil grooves formed between each boss portion 357 or 359 of each side gear 353 or 357 and the spline portion of each output shaft.

Further, as depicted in FIG. 11A, a washer 372 is interposed between the boss portion 357 of the left side gear 353 and the boss portion 345 of the end cover 333. In the same way, another washer 371 is interposed between the boss portion 359 of the right side gear 357 and the boss portion 343 of the casing body 331. These washers 371 and 372 are disposed to secure a smooth rotation of the two side gears 353 and 355 in contact with the inner wall surfaces of the differential casing 321 under a thrust force, respectively.

Further, a side oil passage 398 is formed along the supporting portion 361 in an inner circumferential surface of the boss portion 345 of the end cover 333. In the same way, anther side oil passage 399 is formed along the supporting portion 363 in an inner circumferential surface of the boss portion 343 of the casing body 331. These two side oil passages 398 and 399 are formed to introduce lubricant supplied from the outside of the differential casing 321 along the helical oil groove 346 formed in the inner circumferential surface of the boss portion 345 of the end cover 333 and along the helical oil groove 344 formed in the inner circumferential surface of the boss portion 343 of the casing body 331 to a plurality of pinion gears 377 (described later).

Figure 11B:
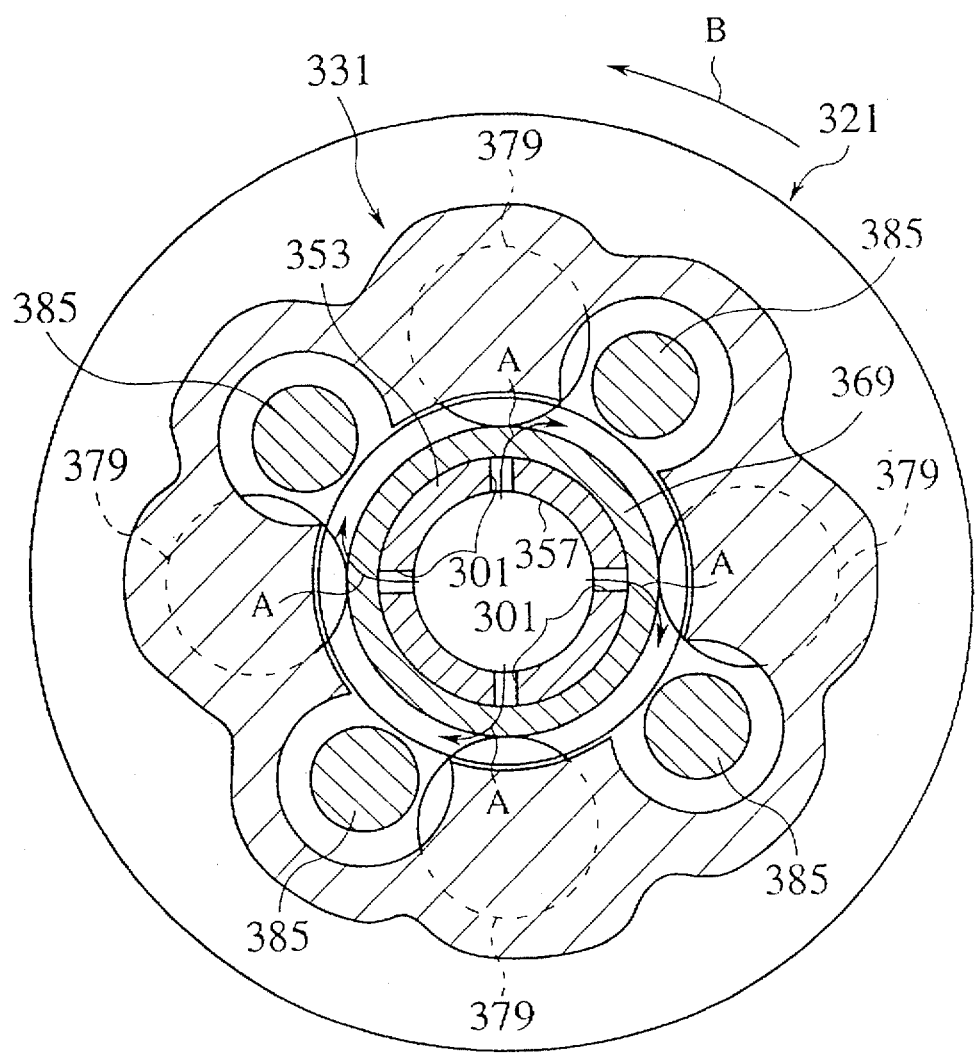
FIG. 11B is a cross-sectional view showing the first embodiment taken along the line 11A—11A shown in FIG. 11A.
Figure 11C:
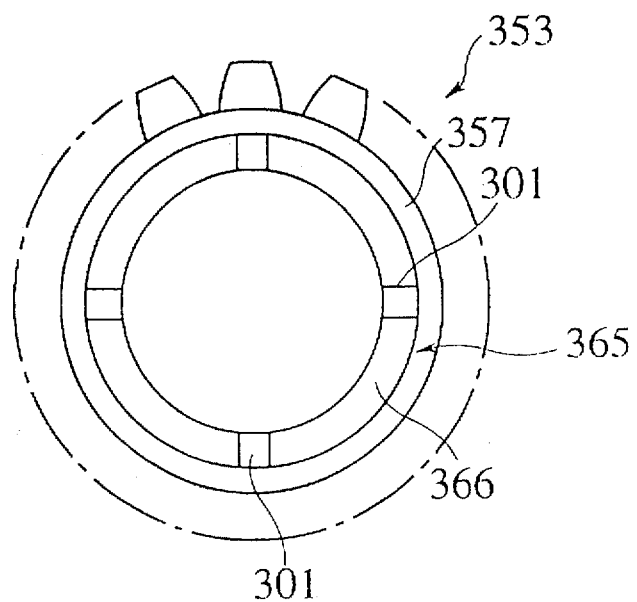
FIG. 11C is a partial cross-sectional view showing the first embodiment, taken along the line 11B—11B shown in FIG. 11A.
Figure 11D:
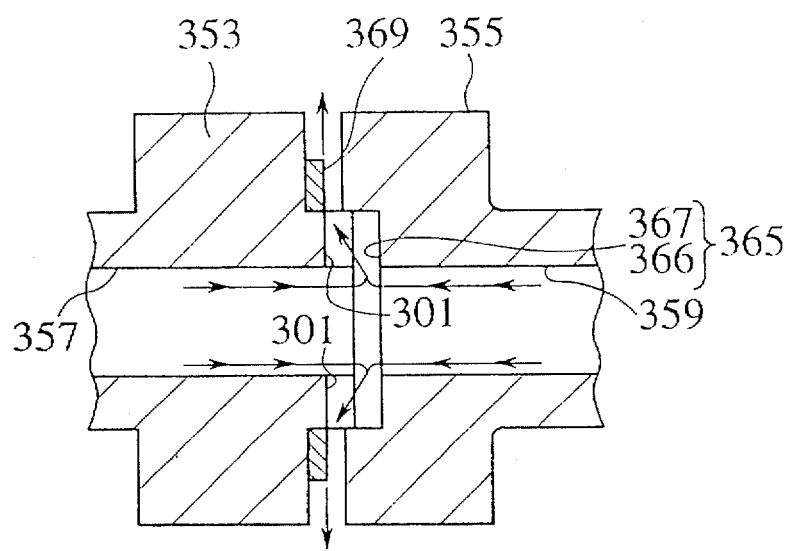
FIG. 11D is a cross-sectional view for assistance in explaining the lubricant flow in the first embodiment.
Figure 11E:
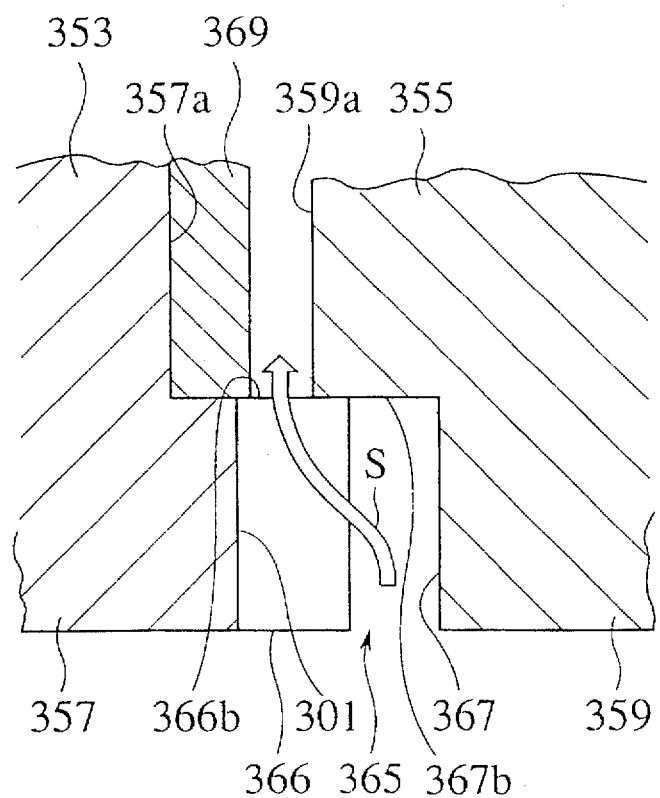
FIG. 11E is an enlarged partial cross-sectional view showing only the portion shown by 11C in FIG. 11A.

Further, as shown in FIGS. 11B, 11C and 11E, a plurality (e.g., four) of central oil passages 301 (the same as the number of the pinion gear pairs (described later) are formed in the end surface of the annular projecting portion 366 of the left side gear 353 as a central oil passage so as to extend radially at regular angular intervals at such positions where the pinion gears are arranged. Therefore, when the differential casing 321 is rotated in the arrow direction B in FIG. 11B, the lubricant introduced into the end surfaces of the two side gears 353 and 355 flows through these radial groove portions 301 in the arrow direction A (See FIG. 11B) or S (See FIG. 11E) and further along the washer 369 toward the pinion gear sides.

Here, the lubricant is introduced into the end surfaces of the two side gears 353 and 355 along the helical oil grooves 344 and 346 formed in the inner circumferential surfaces of the boss portions 343 and 345 of the casing body 331 and the end cover 333, and along the axial oil grooves formed at the spline portions between the two side gears 353 and 355 and the two output shafts spline engaged with the two side gears 353 and 355.

Further, the casing body 331 is formed with a plurality of pairs (four in this embodiment) of long and short accommodation holes 373 and 375 arranged at regular angular intervals along the circumferential direction thereof. Although the long accommodation hole 373 is shown on the lower side and the short accommodation hole 375 is shown on the upper side in FIG. 11A, each pair of the long and short accommodation holes 373 and 375 are formed adjoining to each other as shown in FIG. 11B. Further, these long and short accommodation holes 373 and 375 are bored from the right side of the casing body 331 in FIG. 11A, that is, from the side on which the ring plate 335 is fixed to the casing body 331. The long accommodation holes 373 are formed passing through the casing body 331 from the right side thereof, and openings 396 formed on the left side of the casing body 331 are closed by the end cover 333.

In each pair of the long and short accommodation holes 373 and 375, a pair of long and short helical pinion gears 377 and 379 is slidably and rotatably housed. Therefore, these long and short pinion gears 377 and 379 are rotatable around the axial line LP (See FIG. 11A) parallel to the axial line L of the differential casing 321 and the side gears 353 and 355.

The long pinion 377 is composed of a first gear portion 381, a second gear portion 383 and a small diameter axle portion 385 for connecting both gear portions 381 and 383. The first gear portion 381 is in mesh with the left side gear 353 in FIG. 11A. Further, the short pinion 379 is composed of a first gear portion 387 and a second gear portion 389 formed integral with each other. The first gear portion 387 is in mesh with the right side gear 355 in FIG. 11A. The second gear portion 389 is in mesh with the second gear portion 383 of the paired long pinion gear 377. The second gear portions 383 and 389 of the long and short pinion gears 377 and 379 are located on the right side of the right side gear 355 in the axial direction. Further, the first and second gear portions 381 and 383 of the long pinion gear 377 and the first and second gear portions 387 and 389 of the short pinion gear 379 are all supported by the inner wall surfaces of the accommodation holes 373 and 375 formed in the casing body 331, excepting the gearing portions thereof.

The ring plate 335 is disposed at a position to close the respective accommodation holes 373 and 375 for housing the respective pinion gears 377 and 379 to support the respective end surfaces of these pinion gears 377 and 379, respectively. A central hole 397 in the ring plate 335 is formed in such a way that the inner diameter thereof is larger than the outer diameter of the boss portion 343 of the casing body 331. Therefore, annular oil opening 397 can be formed between the ring plate 335 and the boss portion 343 of the casing body 331. In addition, another oil opening 395 is formed in the outer circumferential wall of the casing body 331 to exhaust lubricant from the differential casing 321.

The operation of the above-mentioned differential apparatus will be described hereinbelow.

An engine power is transmitted to the differential casing 321. When the differential casing 321 is rotated by the engine power, the engine power is distributed to the left and right output shafts via the two long and short helical pinion gears 377 and 379 and the two side gears 353 and 355, respectively. In more detail, when a difference in driving resistance is produced between the two output shafts during travel (as on a muddy road for instance), since the long and short helical pinion gears 377 and 379 are rotated on their own axes, respectively, an engine drive power can be distributed differentially to the left and right wheels, appropriately.

When an engine torque is being transmitted, since the respective helical pinion gears 377 and 379 are brought into pressure contact with the wall surfaces of the respective accommodation holes 373 and 375 due to reaction force generated by gearing between the respective long and short helical pinion gears 377 and 379 and the two side gears 353 and 355, respectively, a frictional resistance is generated. Further, since the end surfaces of the respective long and short helical pinion gears 377 and 379 are brought into contact with the inner wall surfaces of the differential casing 321 due to a thrust force generated by gearing between the long and short helical pinion gears 377 and 379, another frictional resistance is generated. On the basis of these frictional resistances, it is possible to obtain a differential limiting function of torque sensitive type. In this case, the thrust force applied to the respective pinion gears 377 and 379 are received by the end cover 333 and the ring plate 335, respectively.

Further, in operation, lubricant is introduced into the inner circumferential sides of the two boss portions 357 and 359 of the two side gears 353 and 355 through the axial oil grooves formed at the spline portions (by cutting off some spline teeth) between the two inner circumferential surfaces of the two side gears 353 and 355 and the two output shafts, respectively. Also, a gap is formed between the inner end surfaces 357a and 359a of the two side gears 353 and 357, as shown in FIGS. 11D and 11(e), by a thrust force generated by the gearing with the helical pinion gears. Therefore, the lubricant introduced into the inner circumferential sides of both the boss portions 357 and 359 of the two side gears 353 and 355 flows into the outer circumferential side of the washer 369 through the groove portion 301 formed in the end surface of the annular projection portion 366 of the left side gear 353, as shown by an arrow A shown in FIG. 11B and an arrow S shown in FIG. 11E. As a result, since a lubrication flow passage can be formed definitely, it is possible to circulate lubricant smoothly along the sliding portions and the gearing portions of the various gears in the differential casing 321. In other words, a definite lubrication passage can be formed by way of the helical oil grooves 344 and 346 formed in the inner circumferential surfaces of the casing body 331 and the end cover 333, the axial oil grooves formed at the spline portions between the two side gears 353 and 355 and the output shafts, the central oil passage 301 formed in the annular projecting portion 366 of the side gear 353, and the oil openings 395 and 397 formed in the casing body 331.

Figure 12A:
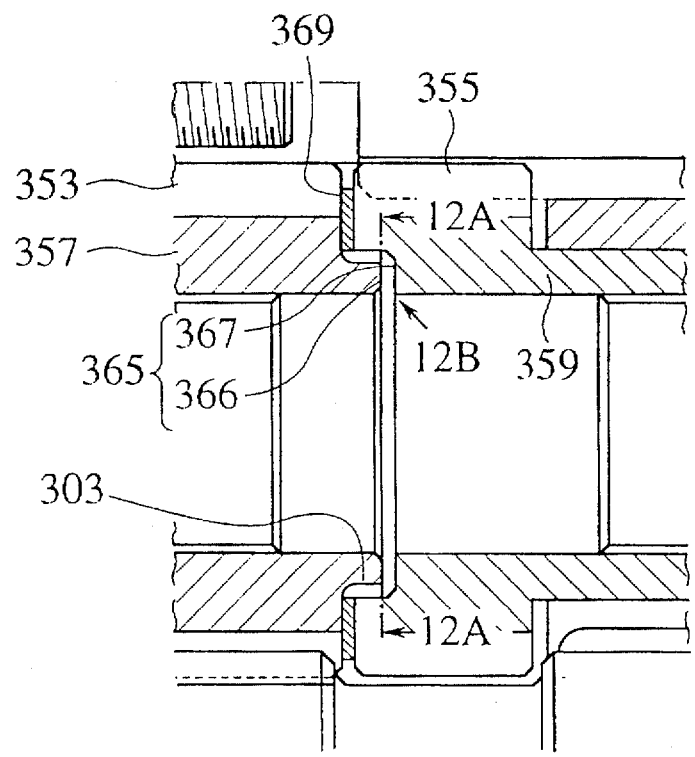
FIG. 12A is a cross-sectional view showing an essential portion of a second embodiment of the differential apparatus of the second aspect of the present invention.
Figure 12B:
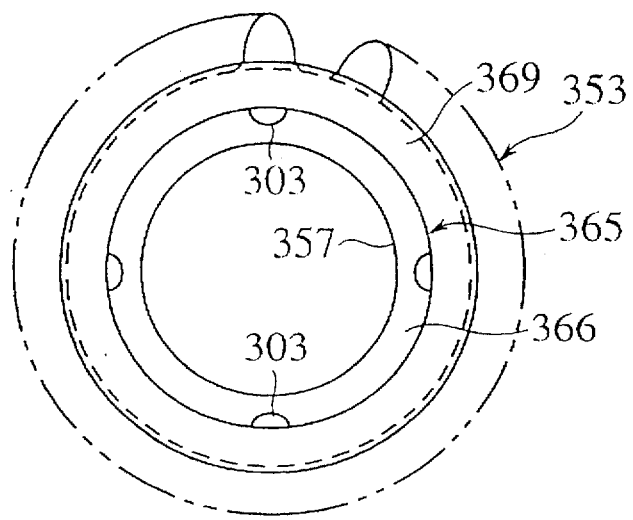
FIG. 12B is a cross-sectional view showing the second embodiment taken along the line 12A—12A shown in FIG. 12A.
Figure 12C:
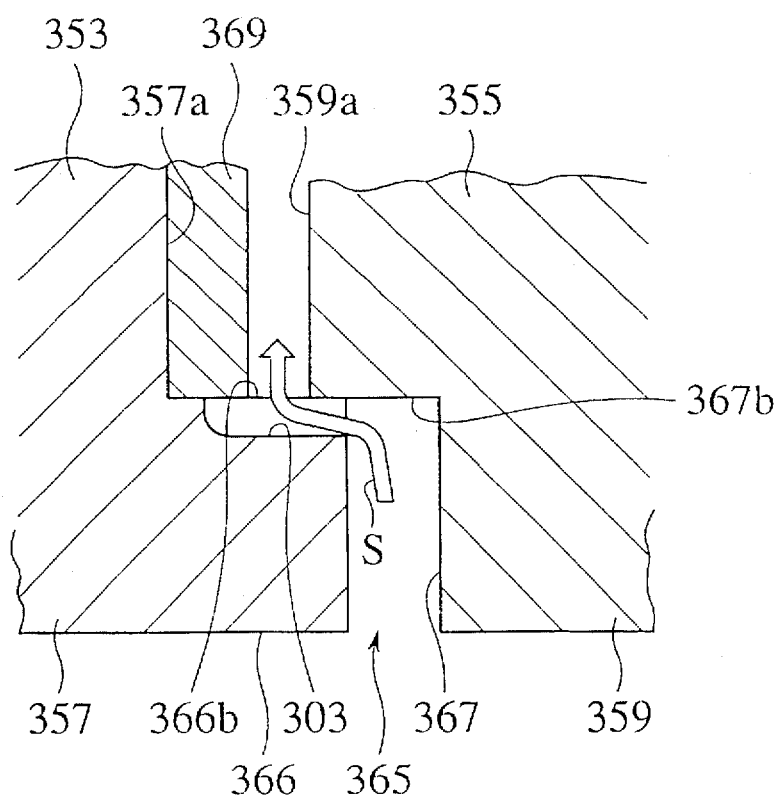
FIG. 12C is an enlarged partial cross-sectional view showing only the portion shown by 12B in FIG. 12A.

The second embodiment of the second aspect of the present invention will be described hereinbelow with reference to FIGS. 12A to 12C. In the first embodiment, the central oil passage 301 is formed on the end surface of the annular projecting portion 366 of the side gear 353. In this second embodiment, the central oil passage 303 is formed on the firing surface 366b of the annular projecting portion 366 of the side gear 353. In this case, the central oil passage 303 is formed from the inner end surface of the annular projecting portion 366 to the root portion thereof in the axial direction of the side gear 353, as depicted in FIG. 12C.

Figure 13A:
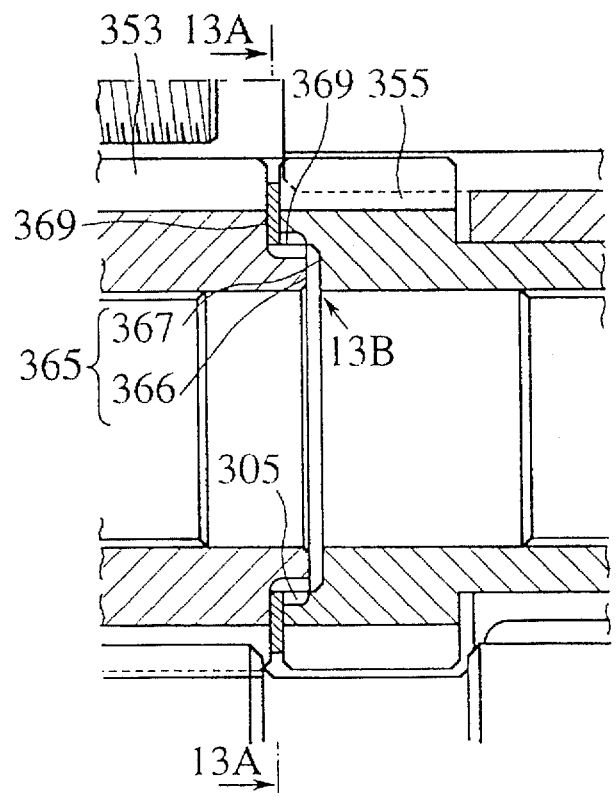
FIG. 13A is a cross-sectional view showing an essential portion of a third embodiment of the differential apparatus of the second aspect of the present invention.
Figure 13B:
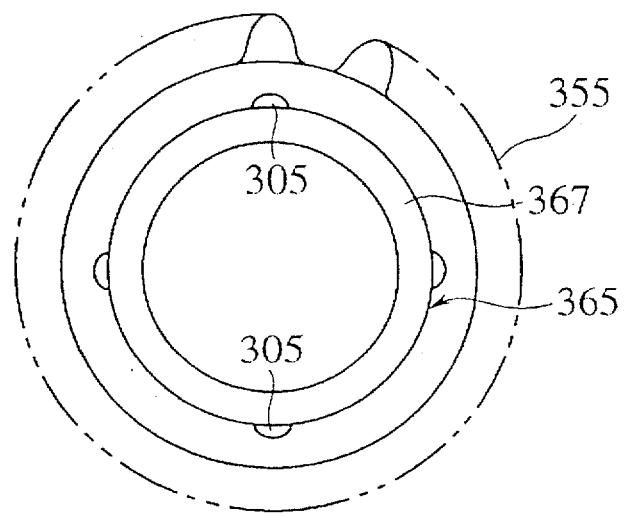
FIG. 13B is a cross-sectional view showing the third embodiment taken along the line 13A—13A shown in FIG. 13A.
Figure 13C:
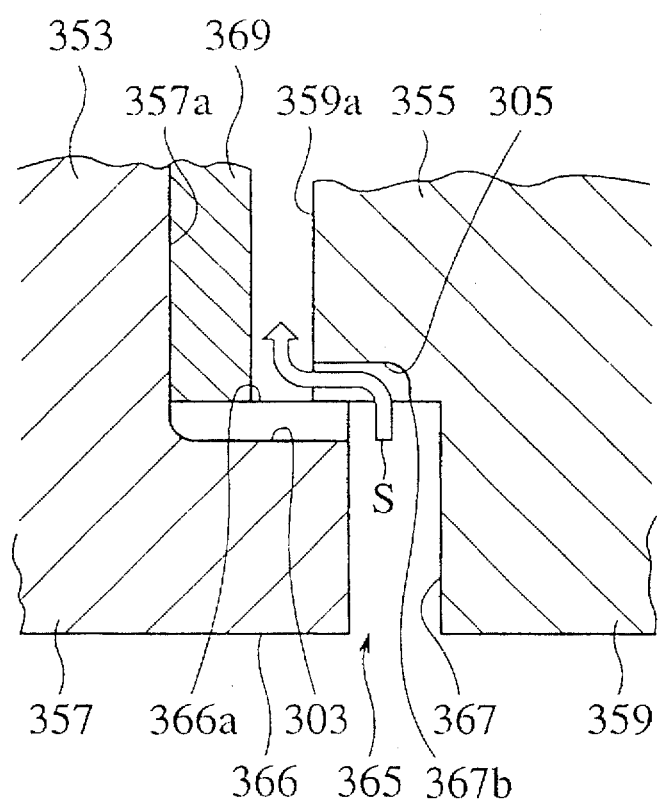
FIG. 13C is an enlarged partial cross-sectional view showing only the portion shown by 13B in FIG. 13A.

The third embodiment of the second aspect of the present invention will be described hereinbelow with reference to FIGS. 13A to 13C. In this embodiment, in addition to the central oil passage 303, another central oil passage 305 is formed on the end surface of the annular recessed portion 367 of the side gear 355. In this third embodiment, the central oil passage 305 is formed on the fitting surface 367b of the annular recessed portion 367 of the right side gear 355. In this case, the central oil passage 305 is formed from the inner end surface of the annular recessed portion 367 to the root portion thereof in the axial direction of the side gear 355.

In the above-mentioned second and third embodiments, a central oil passage can be formed from the inner circumferential side of the boss portions 357 and 359 of the two side gears 353 and 355 to the outer circumferential side of the washer 369, respectively, in the same way as with the case of the first embodiment.

In the case where the side gears and the pinion gears are helical gears, a gap can be produced between the two end surfaces 357a and 359a of the two boss portions 357 and 379 of the two side gears 353 and 355, and used as an oil passage. In the case where the side gears and the pinion gears are spur gears, there exists a possibility that no gap is produced between the two end surfaces 357a and 359a of the two boss portions 357 and 379 of the two side gears 353 and 355. In this case, when other radially extending oil grooves are additionally formed in the end surfaces 357a and 359a of the boss portions 357 and 359 of the two side gears 353 and 355 so as to communicate with the centered oil passage 301, 303 or 305, respectively, it is possible to obtain a more secure oil passage. The radially extending grooves can be formed in either one or both of the end surfaces 357a and 359a. Further, when the washer 369 is used, it is also possible to form some radial oil grooves in one or both side surfaces of the washer 369. Further, it is also preferable to form the above-mentioned radial oil grooves not only when spur gears are used but also when helical gears are used, as with the cases of the above-mentioned embodiments.

Further, in the above-mentioned embodiments, the two side gears 353 and 357 are centered or aligned on each other by fitting the annular projecting portion 366 of the side gear 353 and the annular recessed portion 367 of the side gear 355 to each other. Without being limited only thereto, it is also possible to construct the differential apparatus in such a way that the two side gears 353 and 355 can be aligned with each other by fitting the boss portions 357 and 379 of the two side gears 353 and 355 to the two supporting portions 361 and 363 of the differential casing 321. In this case, lubricant can flows to the centering portions and further to the two washers 371 and 372 disposed between the two side gears 353 and 355 and the differential casing 321, the by way of the two helical oil grooves 344 and 346 formed in the inner circumferential surfaces of the boss portions 343 and 345 of the differential casing 321 and the two side oil passages 398 and 399 formed along the inner wall surfaces of the boss portions 343 and 345 of the differential casing 321.

As described above, in the second aspect of the present invention, the following effects can be obtained:

(1) Since an oil passage can be securely formed at the centering portion at which the two side gears are fitted to each other, it is possible to provide an oil flow from the inner circumferential side to the outer circumferential side of the boss portions of the two side gears, so that the sliding portions and the gear portions of various gears can be lubricated sufficiently.

(2) Since a plurality of the central oil passages (whose number is the same as that of the pinion gear pairs) are formed in the centering portion of the two side gears at regular angular intervals and at positions where the pinion gear pairs are arranged, it is possible to provide an oil flow from the inner circumferential side to the outer circumferential side of the boss portions of the two side gears, so that pinion gears can be lubricated sufficiently between the gearing portions and the sliding portions with the inner wall surfaces of the differential casing.

(3) Since at least one radially and/or axially extending centered oil passage is formed in any one of the end surfaces of the annular projecting and recessed portions of the side gears, it is possible to provide an oil flow from the inner circumferential side to the outer circumferential side of the boss portions of the two side gears, so that the fitting portions and the sliding portions of various gears can be lubricated sufficiently.

A third aspect of the differential apparatus according to the present invention will be described hereinbelow with reference to the attached drawings. The feature of the third aspect is to provide a plurality of radial oil passages extending from the helical oil grooves formed in boss portions of the differential casing to gearing portions between the side gears and the pinion gears, respectively.

A first embodiment of the third aspect will be described hereinbelow with reference to FIGS. 14A to 14C.

Figure 14A:
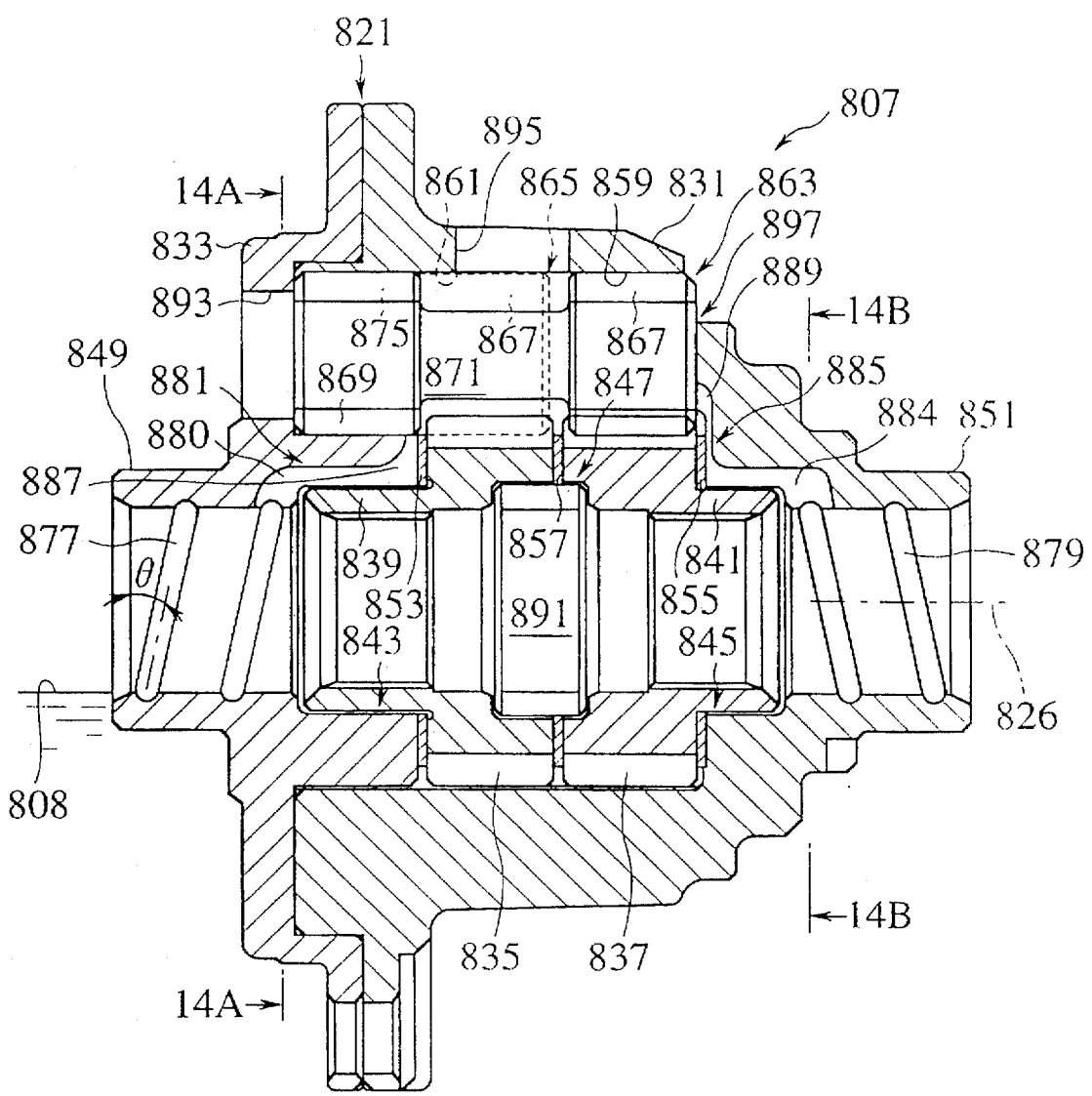
FIG. 14A is a cross-sectional view showing a first embodiment of the differential apparatus of the third aspect of the present invention.

In FIG. 14A, the differential apparatus 807 is composed of a casing body 831 and a cover 833 fixed to the casing body 831 with bolts. Within the differential casing 821, a pair of left and right helical side gears 835 and 837 are arranged. Further, two boss portions 849 and 851 of the differential casing 821 of the differential apparatus 807 are rotatably supported by a differential carrier (not shown) via bearings. When not rotated by an engine power, the differential apparatus 807 is dipped in lubricant 808 stored in an oil reservoir (not shown).

Two hollow boss portions 839 and 841 of the two side gears 835 anal 837 are rotatably supported by two support portions 843 and 845 of the differential casing 821, respectively. Inside the two side gears 835 and 837, a thrust block 847 is disposed in such a way as to extend axially along two inner circumferential surfaces of the two side gears 835 and 837 and to support the respective inner free ends of the two side gears 835 and 837 for centering (alignment), respectively.

Left and right output shafts (not shown) are passed through two boss portions 849 and 851 of the differential casing 821 and further spline-coupled with two spline portions of-the two side gears 853 and 855, respectively. Two thrust washers 853 and 855 are interposed between the inner wall surfaces of differential casing 821 and the two side gears 835 and 837, respectively. Further, a thrust washer 857 is interposed between the two side gears 835 and 837 and on the outer circumferential surface of the thrust block 847.

The differential casing 821 is formed with a plurality (four in this embodiment) of pairs of a long accommodation hole 859 and a short accommodation hole 861, which are arranged at regular angular intervals along the circumferential direction of the casing 821. A long helical pinion gear 863 is slidably and rotatably housed in each of the long accommodation holes 859, and a short helical pinion gear 865 is slidably and rotatably housed in each of the short accommodation holes 861, respectively.

Each long helical pinion gear 863 is formed with a first gear portion 867, a second gear portion 869 and a small diameter axle portion 871 for connecting the first and second gear portions 867 and 869. The first gear portion 867 of the long helical pinion gear 863 is in mesh with the right side gear 837. The short helical pinion gear 865 is formed with first gear portion 873 and a second gear portion 875 formed integral with each other. The first gear portion 873 of the short helical pinion gear 865 is in mesh with the left side gear 835, and the second gear portion 875 of the short helical pinion gear 865 is in mesh with the second gear portion 869 of the long helical pinion gear 863.

In operation, an engine power is transmitted to the differential casing 821. When the differential casing 821 is rotated, the engine power is distributed to the left and right output shafts via the two long and short helical pinion gears 863 and 865 and the two side gears 835 and 837, respectively. In more detail, when a difference in driving resistance is produced between the two output (wheel drive) shafts during travel (as example, on a muddy road for instance) since the long and short helical pinion gears 863 and 865 are rotated on their own axes, respectively, an engine drive power can be distributed differentially to the left and right output shafts, appropriately.

When an engine torque is being transmitted, since the respective helical pinion gears 863 and 965 are brought into pressure contact with the inner wall surfaces of the respective accommodation holes 859 and 861 due to reaction force generated by gearing between the respective long and short helical pinion gears 863 and 865 and the two side gears 835 and 837, respectively, a frictional resistance is generated. Further, since the end surfaces of the respective long and short helical pinion gears 863 and 865 are brought into contact with the inner wall surfaces of the differential casing 821 due to thrust force generated by gearing between the long and short helical pinion gears 863 and 865, another frictional resistance is generated. In addition, another frictional resistance is generated between the two inner end surfaces of the two side gears 835 and 837 via the thrust washer 857 or between the respective side gears 837 and 837 and the inner wall surfaces of the differential casing 821 via the thrust washers 853 and 855, respectively. On the basis of these frictional resistances, it is possible to obtain a differential limiting function of torque sensitive type.

As shown in FIG. 14A, a helical oil groove 877 with an inclination angle (theta) is formed in the inner circumferential surface of the boss portion 849 of the differential casing 821 to introduce lubricant 808 in the oil reservoir to the inside of the differential casing 821 whenever the differential casing 821 is rotated in one direction. Further, another helical oil groove 879 with an inclination angle (theta) in an opposite direction is formed in the inner circumferential surface of the boss portion 851 of the differential casing 821 to introduce lubricant 808 in the oil reservoir to the inside of the differential casing 821 whenever the differential casing 821 is rotated in the other direction. Further, the cover 833 is formed with a radial oil passage 881 having one end 880 communicating with the helical oil groove 877 and the other end 887 extending to the gearing portion between the second gear portion 875 of the short pinion gear 865 and the second gear portion 869 of the long pinion gear 863 (which is located radially outward from the gearing portion between the short pinion gear 865 and the left side gear 835) (See FIG. 14B). Therefore, the other end 887 of the radial oil passage 881 is located radially outward from the one end 880 thereof with respect to the axis 826 of the differential casing 821. The radial oil passage 881 can be formed when the cover 833 is cast.

Figure 14B:
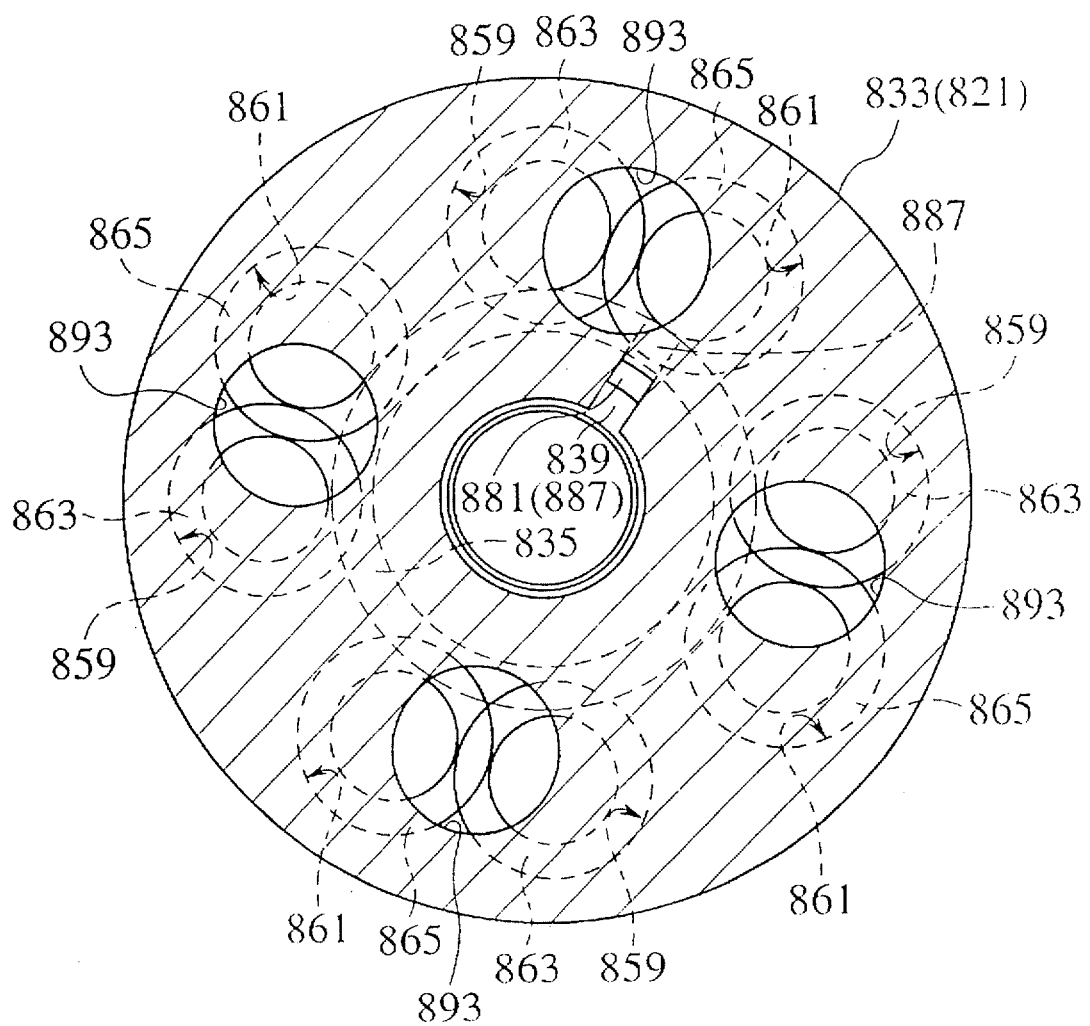
FIG. 14B is a cross-sectional view showing the first embodiment taken along the line 14A—14A shown in FIG. 14A.
Figure 14C:
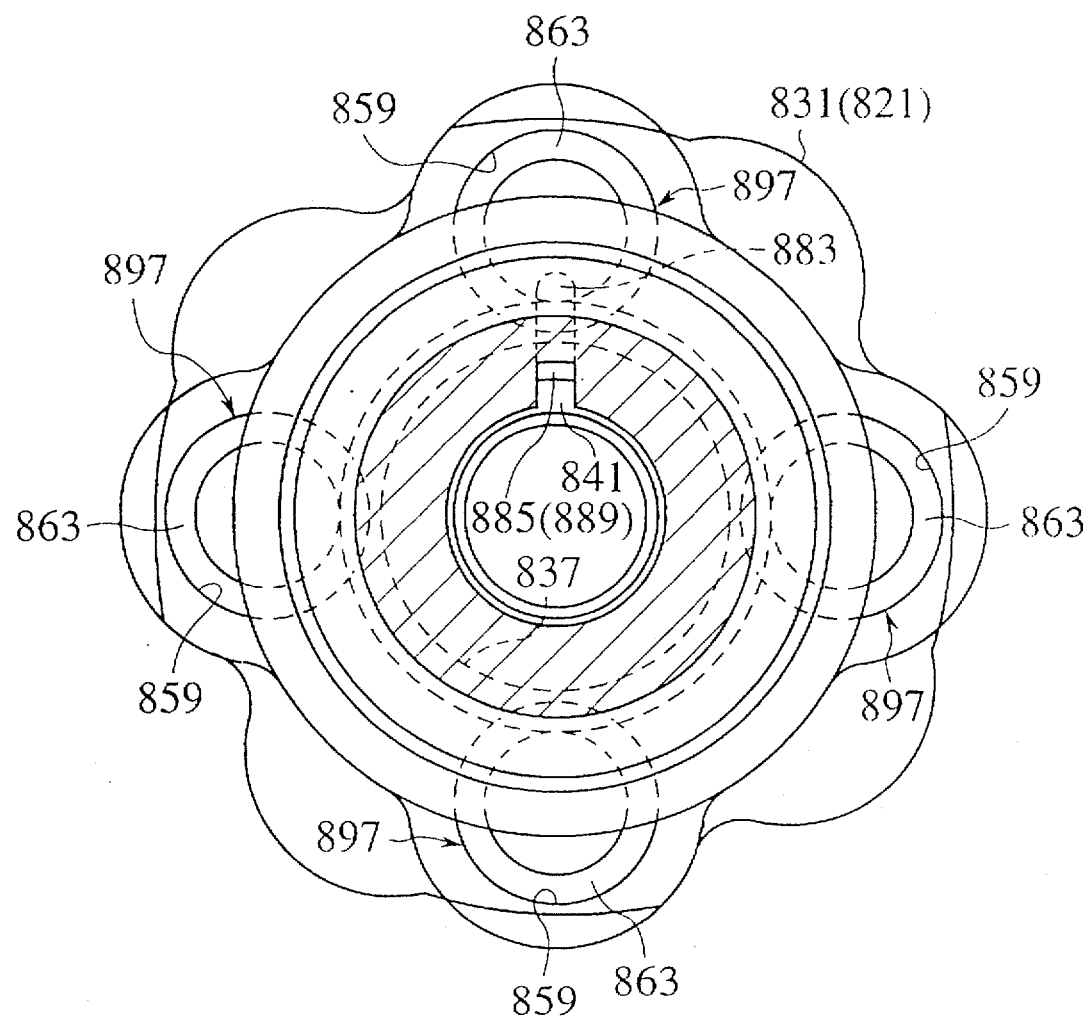
FIG. 14C is a cross-sectional view showing the first embodiment taken along the line 14B—14B shown in FIG. 14A.

In the same way, the casing body 831 is formed with a radial oil passage 885 having one end 884 communicating with the helical oil groove 879 and the other end 889 extending to the first gear portion 867 of the long pinion gear 863 (which is located radially outward from the gearing portion between the first gear portion 867 of the long pinion gear 863 and the right side gear 837) (See FIG. 14B). Therefore, the other end 889 of the radial oil passage 885 is located radially outward from the one end 884 thereof with respect to the axis 826 of the differential casing 821. The radial oil passage 885 can be formed when the casing body 831 is casted.

The thrust block 847 is formed into an elongated oblong shape in such a way that two axial cutout portiota 891 are formed at regular angular intervals along the outer circumference thereof. Therefore, two oil sumps can be formed between the two cutout portions 891 of the thrust block 47 and the inner circumferential surfaces of the two side gears 835 and 837, respectively. Further, some of the spline teeth formed between the boss portion 839 of the side gear 835 are cut off to form axial oil grooves communicating with the helical oil groove 877 formed in the cover 833. In the same way, some of the spline teeth formed between the boss portion 841 of the side gear 837 are cut off to form axial oil grooves communicating with the helical oil groove 879 formed in the casing body 831. Therefore, the two oil sumps formed between the two cutout portions 891 of the thrust block 47 can communicate with the two helical oil grooves 877 and 879 through the axial oil grooves formed at the spine portions between the two side gears 835 and 837 and the output shafts, respectively.

In addition, the differential casing 821 is formed with openings 893, 895 and 897 in the outer wall surface of the differential casing 821, which are all located further radially outward from the other ends 887 and 889 of the radial oil passages 881 and 885.

Accordingly, it is possible to provide a first oil circulating passage between the outside and inside of the differential passage by way of the helical oil grooves 877 and 879, the axial oil grooves formed at the cut-off spline portions, the oil sumps of the thrust block 847, and the openings 893, 895 and 897; and a second oil circulating passage between the outside and the inside of the differential casing 821, by way of the helical oil grooves 877 and 879, the radial oil grooves 881 and 885, and the openings 893, 895 and 897, respectively.

Accordingly, when the differential casing 821 is rotated, since lubricant stored in a differential carrier (not shown) for accommodating the differential casing 821 is thrown, the thrown lubricant is introduced from the two helical oil grooves 877 and 879 formed in the boss portions 849 and 851 of the differential casing 821 into the inside of the differential casing 821, the lubricant flows along the two radial oil passages 881 and 885, by a centrifugal force of the side gears 835 and 837, to the respective sliding portions between the two side gears 835 and 837 and the two thrust washers 853 and 855 and between the two side gears 853 and 837 and the inner wall surfaces of the differential casing 821. The lubricant lubricates the gearing portions between the respective gears and the sliding portions between the respective gears and various inner wall surfaces (e.g., the accommodation holes 859 and 861) of the differential casing 821; and is lastly exhausted to the outside of the differential casing 821 through the openings 893, 895 and 897 due to the same centrifugal force of the differential apparatus, so that the lubricant can be returned to the oil reservoir of the differential carrier.

Since the lubricant circulating passage is formed as described above, lubricant can flow smoothly, so that it is possible to improve both the lubrication effect and the cooling effect. In particular, since the lubricant circulating passage is so formed as to extend radially outward from the two helical oil grooves 877 and 879 to the openings 893, 895 and 897 radially away from the central rotational axis of the differential casing 821, the lubricant can be moved easily radially outward due to a centrifugal force of the various gears, so that the flow of lubricant is enhanced effectively.

Further, when a differential motion occurs between the two side gears 835 and 837, on the side of the left radial oil passage 881, since lubricant is introduced from the second gear portion 875 of the short pinion gear 865 to the gearing portion between the second gear portion 875 of the short pinion gear 865 and the second gear portion 869 or the long pinion gear 863 due to the gearing motion between the short and long pinion gears 865 and 863, the lubricant flow can be enhanced. Further, the lubricant introduced into the gearing portion between the first gear portion 873 of the short pinion gear 865 and the left side gear 835 is pushed into the sliding portion between the side gear 835, the thrust washer 853 and the inner wall of the differential casing 821 due to the pumping action of the gears.

Further, on the side of the right radial oil passage 885, lubricant is sucked through the radial oil passage 885 due to the pumping action of the gearing between the first gear portion 867 of the long pinion gear 863 and the right side gear 837, and then introduced into the sliding portions between the side gear 837, the thrust washer 855 and the inner wall surface of the differential casing 821.

As described above, a great amount of lubricant can be supplied to the respective sliding portions and the respective gearing portions between the two side gears 835 and 837, the two thrust washers 853 and 855, and the inner wall surfaces of the differential casing 821 and further to the other lubrication portions such as the accommodation holes 859 and 861 of the long and short pinion gears 863 and 865, so that the lubrication effect can be further improved. As a result, it is possible to prevent seizure and gall (or scuffing) at the sliding and gearing portions between the two side gears 835 and 837, the two thrust washers 853 and 855 and the inner wall surfaces of the differential casing 821, and further to prevent pitching and gall (or scuffing) at the respective gearing portions between the long and short pinion gears 863 and 865 and the two side gears 835 and 837 and the gearing portions between the long and short pinion gears 863 and 865, respectively.

On the other hand, the lubricant introduced into the differential casing 821 through the two helical oil grooves 877 and 879 flows into the oil sumps of the thrust block 847 through the cut-off spline tooth portiota to lubricate the sliding portions between the thrust block 847 and the two side gears 835 and 837. The lubricant is then pushed radially outward to the thrust washer 857 due to a centrifugal force to lubricate the sliding portions between the thrust washer 857 and the two side gears 835 and 837 and further to the respective gearing portions between the pinion gears 863 and 865 and the inner wall surfaces of the accommodation holes 859 and 861; and then exhausted to the outside of the differential casing 821 through the openings 893, 895 and 897, then being returned to the oil reservoir of the differential carrier. As described above, since a definite lubricant circulating passage can be formed, it is possible to smoothen the lubricant flow, so that the lubrication effect can be improved.

Further, in this embodiment, since the respective gears are helical gears, thrust forces generated by various gears are applied to the respectively sliding portions between the two side gears 835 and 837, the two thrust washer 853 and 855, and the wall surfaces of the differential casing 821 according to the torque inputted to the differential casing 821, so that the sliding pressure increases. In this embodiment, however, since the oil passages are reliably formed, it is possible to supply sufficient lubricant to the respective sliding portions.

Further, since the outer diameter of the thrust block 847 is formed larger than the inner diameter of the boss portions 839 and 841 of the two side gears 835 and 837, lubricant can smoothly flow due to a centrifugal force applied to the differential casing 821, so that the lubrication effect can be further improved at the sliding portions between the thrust washer 857 and the two side gears 835 and 837 and other lubrication portions.

In the present embodiment, since a great amount of lubricant can be supplied to the various sliding portions between the thrust washers 853 and 855 and the side gears 835 and 837, between the side gears 835 and 837 and the differential casing 821, between the thrust washer 857 and the side gears 835 and 837, between the pinion gears 863 and 865 and the accommodation holes 859 and 861 of the differential casing 821, and between the respective pinion gears 863 and 865 and thereby sufficient and secure lubrication can be realized, experiments indicated that seizure and gall or scuffing did not occur, even if a drive torque twice as large as the ordinary drive torque was applied to the differential casing 821 under the same test conditions (other than the drive torque). This indicates that the lubrication structure of the present embodiment can provide a stable differential limiting function. As a result, when the differential apparatus 807 as described above is mounted on an automotive vehicle, since the various sliding portions and gearing portions will not be seized or scuffed, an excellent driving or steering stability can be obtained. Further, since the sliding portions between the two side gears 835 and 837 and the differential casing 821 can be sufficiently lubricated as described above, it is possible to eliminate the thrust washers 853 and 855, respectively.

Further, without being limited only to the above-mentioned structure, the oil grooves can be formed in different ways. For instance, it is possible to form the helical oil grooves on the outer circumferential surfaces of the output shafts, respectively instead of the helical oil grooves 877 and 879, and to form the radial oil passages on the end surfaces of the two side gears, respectively instead of the radial oil passages 881 and 885. Further, the number of the radial oil passages 881 and 885 can be increased in such a way as to be formed for each pair of the long and short pinion gears 863 and 865 or for each of all long and short pinion gears 863 and 865. When the number of the radial oil passages is increased, the lubrication effect can be improved to that extent. Further, it is also possible to form the radial oil passages 881 and 885 to directly communicate with the gearing portions between the long and short pinion gears 863 and 865. In this case, the lubrication effect at the gearing portions can be further increased.

A second embodiment of the third aspect of the present invention will be described hereinbelow with reference to FIGS. 15A to 15B, in which only a cover 33B of the second embodiment of the differential apparatus is shown. The feature of this embodiment is to form the radial oil passages whose number is the same as that of pairs of the pinion gears.

Figure 15A:
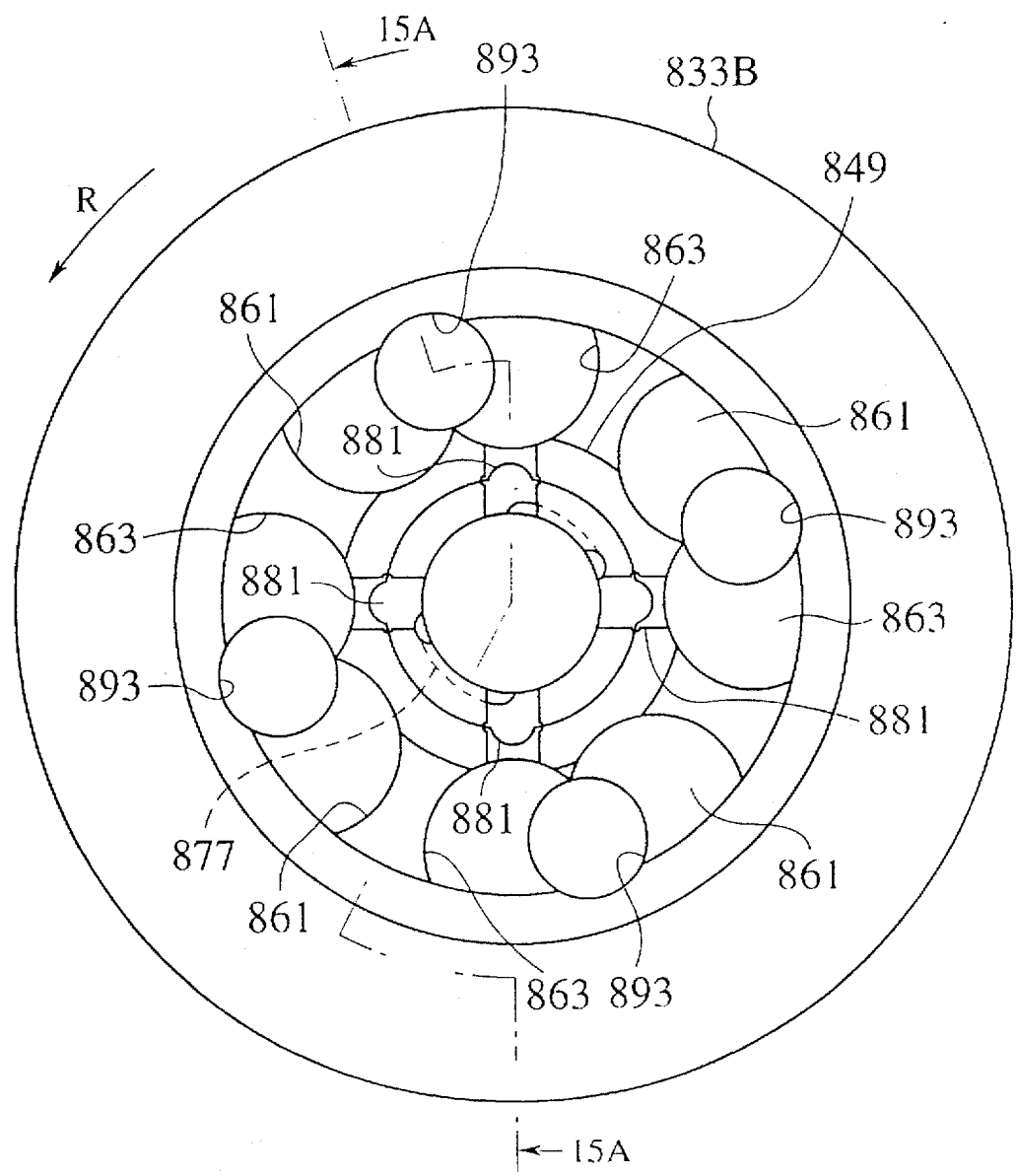
FIG. 15A is a cross-sectional view showing a second embodiment of the differential apparatus of the third aspect of the present invention.
Figure 15B:
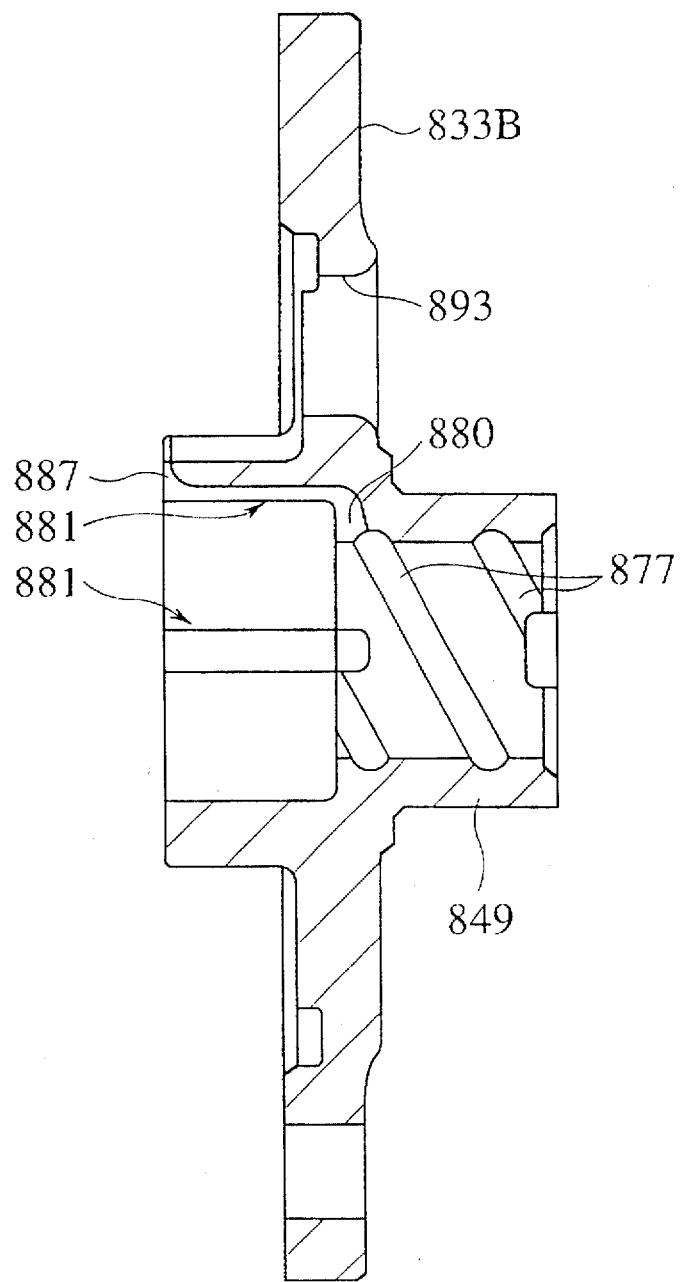
FIG. 15B is a cross-sectional view showing the second embodiment taken along the line 15A—15A shown in FIG. 15A.

FIG. 15A is a plane view obtained when the cover 33B is seen from the inner side of the differential casing, and FIG. 15B is a cross-sectional view taken along the line 15A—15A shown in FIG. 15A, in which the same reference numerals have been retained for similar parts having the same functions as with the case of the first embodiment shown in FIG. 14A.

In the cover 833B shown in FIGS. 15A and 15B, two helical oil grooves 877 are formed in the inner circumferential surface of the boss portion 849 of the cover 833B. Further, four radial oil passages 881 are formed in the boss portion 849 thereof at regular angular intervals along the circumferential direction thereof. Therefore, in this second embodiment, lubricant can be supplied securely and sufficiently to each pair of short and long pinion gears, so that the lubrication effect can be further improved. This is because if only a single radial oil passage 881 as shown in FIG. 14B is used, there exists a dam portion between a pair of the pinion gear accommodation holes and an adjacent pair of the pinion gear accommodation holes. Thus, the quantity of lubricant supplied to the adjacent accommodation holes is relatively small. In contrast with this, in this second embodiment, since lubricant is supplied to each pair of the pinion gear accommodation holes along each radial oil passage 881, it is possible to supply a sufficient amount of lubricant to each pinion gear pair, respectively. Further, in this embodiment two radially inward ends 880 of the two adjacent radial oil passages 881 are connected to one of the two helical oil grooves 877, and two radially inward ends 880 of the other two adjacent radial oil passages 881 are connected to the other of the two helical oil grooves 877.

Further, in this embodiment, the radial oil passage 881 is formed to communicate with the succeeding pinion gear (rotated after the precedent pinion gear) in the ordinary (frontward drive) rotational direction. In more detail, in FIG. 15A, when the differential casing 821 is rotated in the arrow direction R in the frontward vehicle drive, the radial oil passage 881 is formed to communicate with the succeeding accommodation hole 863 of a pair of the two rotating accommodation holes 861 and 863. This is because when the two precedent and succeeding pinion gears are rotating around an axis of the differential apparatus together with the differential casing 821, a frictional force generated between the succeeding pinion gear and its accommodation hole is larger than that generated between the precedent pinion gear and its accommodation hole. As described above, since lubricant is directly introduced into the succeeding rotating pinion gear side, it is possible to sufficiently supply lubricant more effectively to the sliding portions between the pinion gears and the inner wall surfaces of the accommodation holes of the differential casing.

Further, if the radial oil passages 881 communicate into the accommodation holes of the precedent pinion gears, when the differential casing is rotated, the lubricant will flow smoothly from each precedent pinion gear to each succeeding pinion gear.

Further, although not shown, two helical oil grooves 879 are formed in the inner circumferential surface of the boss portion 851 of the casing body 831. Further, four radial oil passages 885 are also formed in the boss portion 851 of the casing body 831 at regular angular intervals along the circumferential direction thereof, in the same way as in the cover 833B.

Figure 16A:
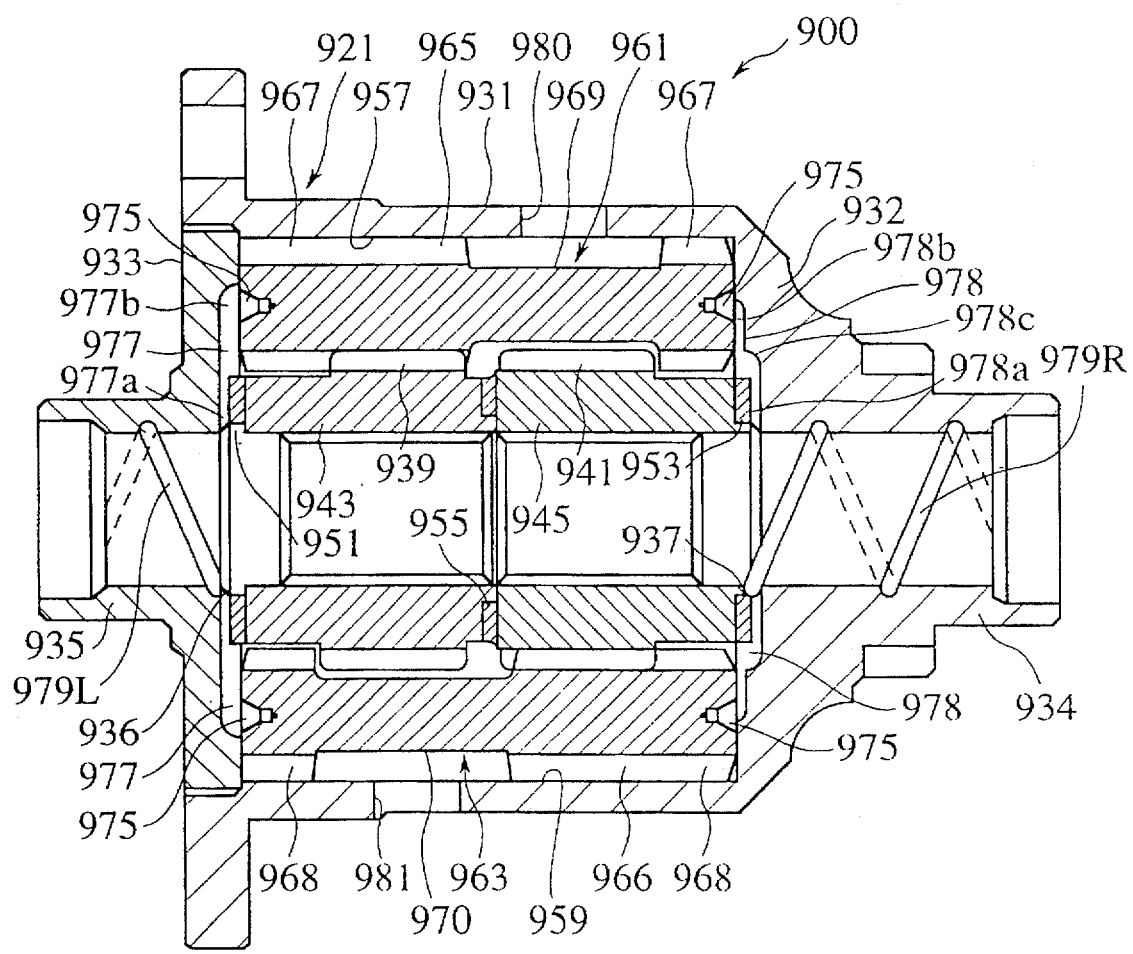
FIG. 16A is a cross-sectional view showing a third embodiment of the differential apparatus of the third aspect of the present invention.
Figure 16B:
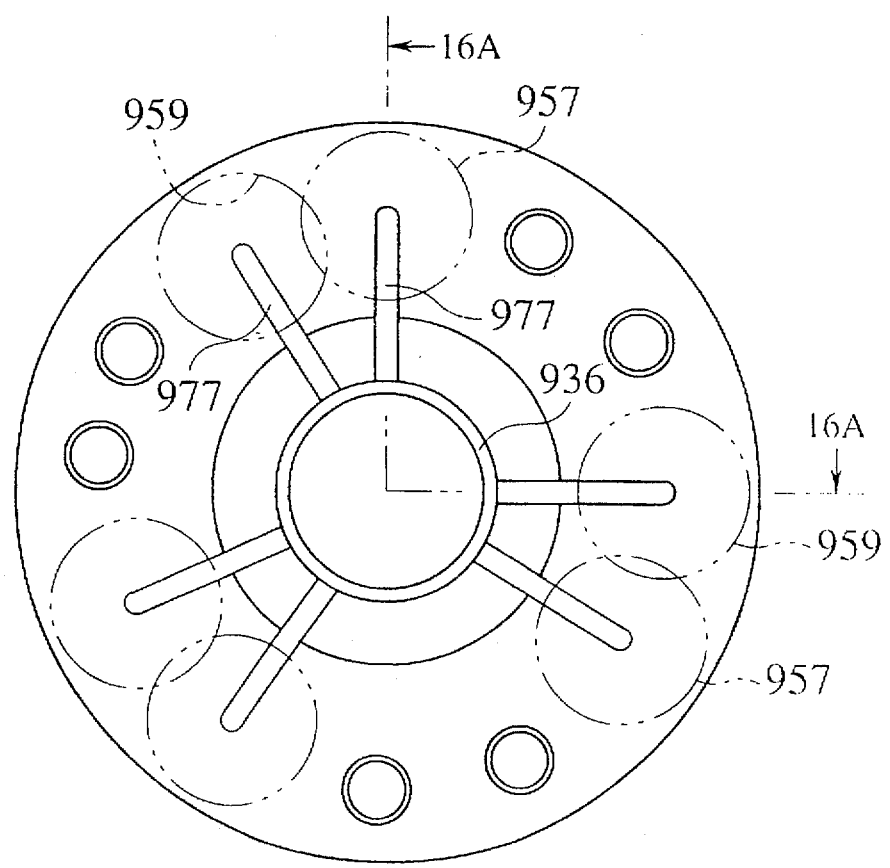
FIG. 16B is an inner cross-sectional view showing a cover for constituting the differential casing of the third differential apparatus shown in FIG. 16A.

A third embodiment of the third aspect of the present invention will be described hereinbelow with reference to FIGS. 16A to 16B. FIG. 16A is a side cross-sectional view of the differential apparatus 900, taken along the line 16A—16A shown in FIG. 16B. FIG. 16 is a plane view obtained when the cover is seen from the inner side of the differential casing in FIG. 16A.

In this embodiment, the differential casing 921 of the differential apparatus 900 is composed of a casing body 931 having a side wall portion 932 and a cylindrical boss portion 934, and a cover 933 having a cylindrical boss portion 935.

The cover 933 is fixed to the casing body 931 with bolts (not shown) in such a way as to close the opening surface of the differential casing 921 on the side opposite from the side wall portion 932. Within the differential casing 921, two left and right side gears 939 and 941 are disposed.

The left side gear 939 is spline engaged with a left output shaft (not shown) via a boss portion 943 thereof, and the right side gear 941 is spline engaged with a right output shaft (not shown) via a boss portion 945 thereof. The respective output (drive wheel) shafts are spline-engaged with the two side gears 939 and 941 passed through the boss portion 935 of the cover 933 and the boss portion 934 of the casing body 931, respectively. Two helical oil grooves 979L and 979R are formed in the inner circumferential surfaces of the boss portion 935 of the cover 933 and the inner circumferential surface of the boss portion 934 of the casing body 931, respectively, in the same way as with the case of the first embodiment shown in FIG. 14A.

Further, two washers 951 and 953 are interposed between the boss portions 943 and 945 of the two side gears 939 and 941 and the inner wall surfaces of the differential casing 921, respectively. Further, a washer 955 is interposed between two inner end surfaces of the two side gears 939 and 941.

In the differential casing 921, a plurality of pairs of accommodation holes 957 and 959 are formed at regular angular intervals in the circumferential direction thereof. Two pinion gears 961 and 963 are slidably and rotatably housed in the two accommodation holes 97 and 959, respectively. The two pinion gears 961 and 963 are of the same shape, but inserted into the two accommodation holes 957 and 959 in the opposite direction with respect to each other. Further, the two side gears 939 and 941 and the two pinion gears 961 and 963 are helical gears.

The pinion gears 961 and 963 are composed of first gear portions 965 and 966, second gear portions 967 and 968, and small diameter axle portions 969 and 970 for connecting the first and second gear portions, respectively. The first gear portion 965 of one pinion gear 961 is in mesh with the left side gear 939. Further, the first gear portion 966 of the other pinion gear 963 accommodated in opposite direction is in mesh with the right side gear 941. Further, the two second gear portions 967 and 968 of the two pinion gears 961 and 963 are in mesh with each other on both axially ends of the two pinion gears 961 and 963. Between these mutually gearing portions of both the pinion gears 961 and 963, the pinion gear 961 is in mesh with the left side gear 939, and the pinion gear 963 is in mesh with the right side gear 941.

On both end surfaces of the two pinion gears 961 and 963, two center holes are formed as chucking holes when machined by a lathe, for instance.

Further, a plurality (two) of radial oil passages 977 are formed in an inner wall surface (the sliding surface of the two pinion gears 961 and 963 and the two side gears 939 and 941) of the cover 933 so as to extend radially outward of the differential casing 921 at such a position as to correspond to the two accommodation holes 957 and 959 for housing the pinion gears 961 and 963, respectively. In the same way, a plurality (two) of radial oil passages 978 are formed in an inner wall surface of the side wall portion 932 of the casing body 931 so as to extend radially outward of the differential casing 921 at such a position as to correspond to the two accommodation holes 957 and 959 for housing the pinion gears 961 and 963, respectively. A radially inward end portion 977a of the radial oil passage 977 communicates with the helical groove 979L. A radially inward end portion 978a of the radial oil passage 978 communicates with the helical oil groove 979R. Each radially outward end portion 977b of the radial oil passage 977 communicates with the center hole 975 formed in the end surface of the pinion gear 961 or 963, and each radially outward end portion 978b of the radial oil passage 978 communicates with the center hole 975 formed in the end surface of the inion gear 961 or 963.

Further, in order to reliably communicate the helical oil grooves 979L and 979R with the radial oil passages 977 and 978, two radially inward opening ends 977a and 978a of the radial oil passages 977 and 978 are chamfered at the chamfered portions 936 and 937 at which the radial oil passages 977 and 978 open toward the through holes of the boss portions 935 and 934. Therefore, the helical oil grooves 979L and 979R communicate with the radial oil passages 977 and 978 through gaps formed between the chamfered portions 936 and 937 and the washers 951 and 953, respectively. Instead of the chamfered portions 936 and 937, it is also possible to communicate the radial oil passages 977 and 978 with the helical oil grooves 979L and 979R, respectively by forming annular cutouts or stepped portions, respectively.

Further, the differential casing 921 is formed with a plurality of openings 980 communicating with the accommodation holes 957 of the pinion gears 961, and a plurality of openings 981 communicating with the accommodation holes 959 of the pinion gears 963. Therefore, when the differential apparatus 900 is rotated, lubricant in a differential carrier (not shown) thrown by a ring gear fixed to the differential casing 921 is exhausted from the differential casing 921 through these openings 979 and 981, respectively.

In the differential apparatus 900 of this embodiment, since the radial oil passages 977 and 978 extend to the positions communicating with the centered holes 975 formed in the end surfaces of the pinion gears 961 and 963, respectively, it is possible to supply lubricant introduced into the helical oil grooves 979L and 979R sufficiently to the sliding portions between the end surfaces of the two side gears 939 and 941 and the inner Wall surfaces of the differential casing 921, to the gearing portions between the side gears 939 and 941 and the pinion gears 961 and 963, and to the sliding portions between the end surfaces of the pinion gears 961 and 963 and the inner wall surfaces of the differential casing 921, respectively.

Therefore, since the various sliding and gearing portions within the differential casing 921 can be lubricated sufficiently, it is possible to prevent seizure, gall (scuffing) or abnormal noise from being produced from the differential apparatus. In particular, since the sliding portions at the end surfaces of the pinion gears 961 and 963 and the side gears 939 and 941 which faced against the inner wall surfaces of the differential casing 921 can be sufficiently lubricated, the differential limiting characteristics can be stabilized. In addition, since the other sliding portions and the mutual gearing portions of the pinion gears 961 and 963 can be sufficiently lubricated, the lubrication effect can be improved. Further, since the differential casing 921 is formed with openings 980 and 981, it is possible to further smoothen the lubricant flow in the same way as with the case of the first embodiment shown in FIG. 14A.

Further, as shown in FIG. 16A, when the right radial oil passage 978 is formed with a stepped portion 978c midway from the radially inward end 978a and the radially outward end 978b of the right side radial oil passage 978 and further when the cross-sectional area of the radial oil passage 978 is reduced from the inward end 978a to the outward end 978b, the moving speed of the lubricant flowing through the radial oil passage 978 due to a centrifugal force of the differential casing 921 is increased. Thus, it is possible to more effectively move the lubricant radially outward to the end surfaces of the pinion gears 961 and 963.

Further, without being limited to only the above-mentioned embodiment, it is possible to form the helical oil grooves 979L and 979R in the outer circumferential surfaces of the output shafts and the radial oil passages 977 and 978 in the end surfaces of the boss portions 943 and 945 of the side gears 939 and 941, respectively.

The above-mentioned differential apparatus 807 and 900 can be used as a rear wheel side differential gear for distributing engine power to the rear right and left wheels, a front wheel side differential gear for distributing engine power to the front right and left wheels, or as a center differential gear for distributing engine power to the front and rear wheels), respectively.

As described above, in the third aspect of the present invention, the following effects can be obtained:

(1) Since the helical oil grooves are formed between the inner circumferential surfaces of the boss portions of the differential casing and the outer circumferential surfaces of the output shafts respectively, and since the radial oil passages are formed between the two side gears and the differential casing, respectively in such a way that the radially inward ends thereof communicate with the ends of the helical oil grooves and further with the sliding portions between the side gears and the inner walls of the differential casing respectively, lubricant introduced from the oil reservoir due to the rotation of the differential casing can be supplied to the sliding portions between the side gears and the differential casing, so that it is possible to prevent seizure at these sliding portions and thereby a stable differential limiting force can be obtained.

(2) Since the radially outward ends of the radial oil passages are located at the gearing portions between the pinion gears and the side gears, it is possible to prevent seizure and gall at the sliding portions between the side gears and the differential casing, the gearing portions between the pinion gears and the side gears, and the sliding portions between the pinion gears and the accommodation holes of the differential casing. Further, when the pinion gears and the side gears are being rotated, since lubricant can be supplied to the sliding portions between the side gears and the differential casing due to the pumping action of the pinion and side gears, it is possible to prevent seizure and gall at the sliding portions.

We claim:

1. A differential apparatus (7), comprising:
   a differential casing (21) to be rotated by an engine power;
   a plurality of pinion gears (65, 66) slidably housed in accommodation holes (63, 64) formed in said differential casing;
   a pair of side gears (35, 37) engaged with each other via said pinion gears, two opposing end surfaces thereof being slidable relative to each other (61);
   a block member (47, 91, 97) interposed between two inner circumferential surfaces of said two side gears to center said two side gears, respectively; and
   at least one oil sump (77, 79; 95; 101) formed between said block member and said two side gears, to supply lubricant to sliding portions between said block member (47, 91, 97) and said two side gears (35, 37) and between said two opposing end surfaces of said two side gears, by a centrifugal force generated by said rotating differential casing.

2. The differential apparatus of claim 1, wherein said differential casing is formed with helical oil grooves (81, 83) in inner circumferential surfaces of two boss portions (49, 51) thereof, respectively; and each of said two side gears is formed with an axial oil groove formed at a spline portion (53, 55) between said side gear and an output shaft spline-engaged with said side gear to communicate with the helical oil groove (81, 83) and with said at least one oil sump (77, 79; 95; 101), respectively.

3. The differential apparatus of claim 1, wherein the two output shafts are vehicle wheel drive shafts for transmitting engine power to two vehicle wheels, respectively; and said block member (47, 91, 97) is a thrust block for locating axial positions of the two vehicle wheel drive shafts.

4. The differential apparatus of claim 1, wherein an outer diameter (D1) of said oil sumps (77, 79; 95; 101) is larger than an inner diameter (D2) of two boss portions (39, 41) of said two side gears (35, 37).

5. The differential apparatus of claim 1, wherein there are at least two oil sumps (77, 79) formed by cutout portions (73, 75) formed by cutting off said block member (47) at regular angular intervals in the circumferential surface of said block member (47).

6. The differential apparatus of claim 1, wherein oil sump (95) is formed by cutting off a helical groove (93) in an outer circumferential surface of said block member (91).

7. The differential apparatus of claim 1, wherein there are a plurality of said oil sumps (101) formed by cutting off a plurality of axial grooves (99) in an outer circumferential surface of said block member (97).

8. The differential apparatus of claim 1, wherein a circulating lubrication passage is formed within said differential casing, by way of two helical oil grooves (81, 83) formed in two inner circumferential surfaces of two boss portions (49, 51) of said differential casing (21); the axial oil grooves formed at spline portions (53, 55) between said side gears (35, 37) and the output shafts spline-engaged with a plurality of said side gears, respectively; said oil sumps (77, 79; 95; 101) formed by said block member; the accommodation holes (63, 64) for housing said pinion gears (65, 66), respectively; and openings (85, 87) formed in said differential casing and communicating between the accommodation holes and the outside of said differential casing.

9. The differential apparatus of claim 1, wherein said pinon gears and side gears are helical gears.

10. The differential apparatus of claim 1, wherein said side gears (35, 37) are the same in shape.

11. The differential apparatus of claim 1, wherein said two opposing end surfaces are slid relative to each other, directly on each other.

12. The differential apparatus as recited in claim 1, wherein a thrust washer (61) is disposed between said two opposing end surfaces, and said two opposing end surfaces slide relative to each other on said thrust washer.

* * * * *